(12) United States Patent
Yamagata et al.

(10) Patent No.: US 12,454,735 B2
(45) Date of Patent: *Oct. 28, 2025

(54) GRAIN-ORIENTED ELECTRICAL STEEL SHEET, FINISH ANNEALING-USE STEEL SHEET, ANNEALING SEPARATOR, METHOD FOR MANUFACTURING GRAIN-ORIENTED ELECTRICAL STEEL SHEET, AND METHOD FOR MANUFACTURING FINISH ANNEALING-USE STEEL SHEET

(71) Applicant: NIPPON STEEL CORPORATION, Tokyo (JP)

(72) Inventors: Ryutaro Yamagata, Tokyo (JP); Nobusato Morishige, Tokyo (JP); Ichiro Tanaka, Tokyo (JP)

(73) Assignee: NIPPON STEEL CORPORATION, Tokyo (JP)

(*) Notice: Subject to any disclaimer, the term of this patent is extended or adjusted under 35 U.S.C. 154(b) by 517 days.

This patent is subject to a terminal disclaimer.

(21) Appl. No.: 17/901,936

(22) Filed: Sep. 2, 2022

(65) Prior Publication Data

US 2023/0002849 A1 Jan. 5, 2023

Related U.S. Application Data

(63) Continuation-in-part of application No. 17/421,338, filed as application No. PCT/JP2020/000337 on Jan. 8, 2020, now abandoned.

(30) Foreign Application Priority Data

Jan. 8, 2019 (JP) .................................. 2019-001158

(51) Int. Cl.
*C21D 9/46* (2006.01)
*C21D 6/00* (2006.01)
(Continued)

(52) U.S. Cl.
CPC .............. *C21D 9/46* (2013.01); *C21D 6/005* (2013.01); *C21D 6/008* (2013.01); *C21D 8/1222* (2013.01);
(Continued)

(58) Field of Classification Search
None
See application file for complete search history.

(56) References Cited

U.S. PATENT DOCUMENTS 11,634,787 B2 * 4/2023 Yamagata .............. C22C 38/60
428/471
2009/0047537 A1 2/2009 Nanba et al.

FOREIGN PATENT DOCUMENTS

| JP | 6-88171 A | 3/1994 |
| JP | 8-269552 A | 10/1996 |

(Continued)

*Primary Examiner* — Anthony M Liang
(74) *Attorney, Agent, or Firm* — Birch, Stewart, Kolasch & Birch, LLP

(57) ABSTRACT

Grain-oriented electrical steel sheet excellent in magnetic properties and adhesion of a primary coating to a base steel sheet and with few defects where the base metal is exposed in point defects and a method for manufacturing grain-oriented electrical steel sheet are provided. This is characterized by being provided with a base steel sheet and a primary coating. The primary coating satisfies (1) Number density D3 of Al concentrated regions: 0.015 to 0.150/μm² (2) (Area S5 of regions comprised of anchoring oxide layer regions and Al concentrated regions)/(area S3 of Al concentrated regions)≥0.30, (3) Distance H5 of mean value of heights in thickness direction of regions of comprised of anchoring oxide layer regions and Al concentrated regions minus H0: 0.4 to 4.0 μm, (4) (Perimeter L5 of regions comprised of anchoring oxide layer regions and Al concentrated regions)/(observed area S0): 0.020 to 0.500 μm/μ², (Continued)

and (5) (Area S1 of anchoring oxide layer regions)/(observed area S0)≥0.15.

2 Claims, 3 Drawing Sheets

(51) Int. Cl.
- *C21D 8/12* (2006.01)
- *C22C 38/00* (2006.01)
- *C22C 38/02* (2006.01)
- *C22C 38/04* (2006.01)
- *C22C 38/06* (2006.01)
- *C22C 38/16* (2006.01)
- *C22C 38/60* (2006.01)
- *H01F 1/147* (2006.01)

(52) U.S. Cl.
CPC ......... *C21D 8/1233* (2013.01); *C21D 8/1255* (2013.01); *C21D 8/1283* (2013.01); *C22C 38/001* (2013.01); *C22C 38/002* (2013.01); *C22C 38/008* (2013.01); *C22C 38/02* (2013.01); *C22C 38/04* (2013.01); *C22C 38/06* (2013.01); *C22C 38/16* (2013.01); *C22C 38/60* (2013.01); *H01F 1/14775* (2013.01); *C22C 2202/02* (2013.01)

(56) References Cited

FOREIGN PATENT DOCUMENTS

| | | |
|---|---|---|
| JP | 2005-290446 A | 10/2005 |
| JP | 2008-127634 A | 6/2008 |
| JP | 2012-214902 A | 11/2012 |
| JP | 2018-66061 A | 4/2018 |

* cited by examiner

| $\frac{1}{16}$ | $\frac{2}{16}$ | $\frac{1}{16}$ |
|---|---|---|
| $\frac{2}{16}$ | $\frac{4}{16}$ | $\frac{2}{16}$ |
| $\frac{1}{16}$ | $\frac{2}{16}$ | $\frac{1}{16}$ |

GRAIN-ORIENTED ELECTRICAL STEEL SHEET, FINISH ANNEALING-USE STEEL SHEET, ANNEALING SEPARATOR, METHOD FOR MANUFACTURING GRAIN-ORIENTED ELECTRICAL STEEL SHEET, AND METHOD FOR MANUFACTURING FINISH ANNEALING-USE STEEL SHEET

CROSS REFERENCE TO RELATED APPLICATIONS

This application is a Continuation-in-Part of copending application Ser. No. 17/421,338, filed on Jul. 7, 2021, which is the National Phase under 35 U.S.C. § 371 of International Application No. PCT/JP2020/000337, filed on Jan. 8, 2020, which claims the benefit under 35 U.S.C. § 119(a) to Application No. 2019-001158, filed in Japan on Jan. 8, 2019, all of which are hereby expressly incorporated by reference into the present application.

FIELD

The present invention relates to grain-oriented electrical steel sheet, finish annealing-use steel sheet, an annealing separator, a method for manufacturing grain-oriented electrical steel sheet, and a method for manufacturing finish annealing-use steel sheet.

BACKGROUND

Grain-oriented electrical steel sheet is steel sheet comprising, by mass %, Si in 0.5 to 7% or so and having crystal orientations controlled to the {110}<001> orientation (Goss orientation). For control of the crystal orientations, the phenomenon of catastrophic grain growth called secondary recrystallization is utilized.

The method for manufacturing grain-oriented electrical steel sheet is as follows: A slab is heated and hot rolled to produce hot rolled steel sheet. The hot rolled steel sheet is annealed according to need. The hot rolled steel sheet is pickled. The pickled hot rolled steel sheet is cold rolled by a cold rolling rate of 80% or more to produce cold rolled steel sheet. The cold rolled steel sheet is decarburization annealed to cause primary recrystallization. The decarburization annealed cold rolled steel sheet is finish annealed to cause secondary recrystallization. Due to the above process, grain-oriented electrical steel sheet is produced.

After the above-mentioned decarburization annealing and before the finish annealing, an annealing separator having MgO as a main constituent is deposited on the surface of the cold rolled steel sheet. Usually, the method is to coat an aqueous slurry comprising the annealing separator components on the cold rolled steel sheet and make it dry. The cold rolled steel sheet with the annealing separator deposited on it is taken up into a coil, then is finish annealed. At the time of finish annealing, the MgO in the annealing separator and the $SiO_2$ in the internal oxide layer formed on the surface of the cold rolled steel sheet at the time of decarburization annealing react whereby a primary coating having forsterite ($Mg_2SiO_4$) as a main constituent is formed on the steel sheet surface. After forming the primary coating, the primary coating is, for example, formed with an insulating coating (also referred to as a "secondary coating") comprised of colloidal silica and a phosphate. The primary coating and insulating coating are smaller in heat expansion coefficient than the base steel sheet. For this reason, the primary coating, together with the insulating coating, imparts tension to the base steel sheet to reduce the iron loss. The primary coating, furthermore, raises the adhesion of the insulating coating on the base steel sheet. Therefore, the adhesion of the primary coating on the base steel sheet is preferably higher.

On the other hand, raising the magnetic flux density and lowering the hysteresis loss are effective for lowering the iron loss of grain-oriented electrical steel sheet.

To raise the magnetic flux density of grain-oriented electrical steel sheet, it is effective to control the crystal orientations of the base steel sheet to the Goss orientation. Art for improving integration to the Goss orientation is proposed in PTLs 1 to 3. In these patent literature, elements improving the magnetic properties which strengthen the action of the inhibitors (precipitates suppressing normal crystal grain growth) (Cu, Sn, Sb, Bi, Te, Pb, Se, etc.) are comprised in the base steel sheet. Due to this, integration of the crystal orientations to the Goss orientation rises and the magnetic flux density of the grain-oriented electrical steel sheet can be raised.

However, the interface of a base steel sheet and primary coating is formed so that the interfacial energy becomes as low as possible by making the interface of the base steel sheet and the primary coating flat. In particular, if the base steel sheet comprises elements for improving the magnetic properties, it is easier to make the interface flat. If the interface of the base steel sheet and the primary coating becomes flatter, the anchoring structures of the primary coating causing physical bonding strength between the primary coating and the base steel sheet are lost, so adhesion of the primary coating to the base steel sheet falls. In particular, due to the compressive stress caused by the bending operations, peeling becomes easier and the adhesion remarkably falls.

Art for raising the adhesion of a primary coating with a steel sheet is described in PTLs 4 and 5.

In PTL 4, the slab constituents are made to include Ce in 0.001 to 0.1 mass % and the surface of the steel sheet is formed with a primary coating comprising Ce in 0.01 to 1000 m g/m². In PTL 5, the grain-oriented electrical steel sheet contains Si: 1.8 to 7 mass %, has a primary coating having forsterite as a main constituent, comprises in the primary coating one or two of Ce, La, Pr, Nd, Sc, and Y in a basis weight per side of 0.001 to 1000 m g/m², and comprises one or more of Sr, Ca, and Ba in a basis weight per side of a total amount of 0.01 to 100 m g/m².

In PTL 5, a method of manufacture including a series of processes for coating and drying an annealing separator on a surface of a base steel sheet which has been decarburization annealed then finish annealing it. A method for manufacturing grain-oriented electrical steel sheet excellent in magnetic properties and primary coating adhesion characterized by making the annealing separator having MgO as its main constituent comprise one or more of oxides, hydroxides, sulfates, or carbonates of Ce, La, Pr, Nd, Sc, and Y with a mean particle size of 0.1 to 25 μm in a total amount with respect to the MgO, converted to metal, of a range of 0.01 to 14 mass % is disclosed.

CITATIONS LIST

Patent Literature

[PTL 1] Japanese Unexamined Patent Publication No. 6-88171

[PTL 2] Japanese Unexamined Patent Publication No. 8-269552
[PTL 3] Japanese Unexamined Patent Publication No. 2005-290446
[PTL 4] Japanese Unexamined Patent Publication No. 2008-127634
[PTL 5] Japanese Unexamined Patent Publication No. 2012-214902

SUMMARY

Technical Problem

However, in PTL 5, regarding the adhesion of the primary coating, the effect of reducing peeling of the end faces caused by a shearing operation is alluded to, but regarding the resistance to peeling due to a bending operation, bending operations of tens of mmφ or so are not evaluated as being smaller in workability than shearing operations. The behaviors in peeling due to shearing and bending differ, so to secure the adhesion of a primary coating to a base steel sheet in electrical steel sheet used for the method of manufacturing iron cores with high bendability in recent years, adhesion whereby the primary coating will not peel off when bending under tougher conditions than the past is necessary. Even in a material with no problem in resistance to peeling of the sheared end faces, sometimes resistance to tough bending operations cannot necessarily be obtained.

Further, in the process of purification of the constituents of the steel sheet in the latter stage of the finish annealing, nitrogen and other gases contained in the steel sheet is released. At this time, the primary coating slows the passage of the gas. At this time, if the speed of passage of gas through the primary coating becomes too slow, the gas pressure at the interface of the primary coating and the base iron becomes high and the primary coating will sometimes be blown off and destroyed. Due to this, exposed parts of the base material of point shapes of a size able to be discerned by the naked eye appear at the surface of the steel sheet. If these point shaped exposed parts of the base material appear at a number density of a certain high extent across a broad range of the surface of the steel sheet, serious defects occur in the insulation and quality of appearance. The techniques for improving the adhesion of the primary coating mentioned above do not necessarily suppress point defects, so art for controlling the form of the primary coating not giving rise to point defects has been sought.

Regarding the adhesion of the primary coating, various studies have been conducted on peeling of the end faces in shearing operations and peeling of the surface in bending operations, but it cannot be said that optimal steel sheet and manufacturing methods have been proposed strictly differentiating between these. The behavior and mechanism of peeling due to shearing and bending and the generation of high pressure gas differ, so if used for a method for manufacturing iron cores, which requires bending operations, adhesion whereby the primary coating will not peel off when performing bending operations severer than the past and suppression of defects in the primary coating caused by the generation of gas from the steel sheet become necessary. If including Y, La, Ce, Sr, Ca, and Ba in the annealing separator to form a primary coating comprising Y, La, Ce, Sr, Ca, and Ba, there are technical issues such as the case where there might be no problem with adhesion of the primary coating with respect to shearing operations, but the adhesion of the primary coating with respect to bending operations would be insufficient or the case where gas generated from the steel sheet during the finish annealing would cause destruction of the primary coating of the base steel sheet and the occurrence of defects where the surface of the steel sheet is exposed in point shapes. For this reason, as electrical steel sheet free from problems in insulation and appearance and high in reliability, a material with adhesion of the primary coating with respect to bending operations (below, referred to simply as the "coating adhesion") and with few defects where the base metal is exposed in point shapes has been desired.

An object of the present invention is to provide grain-oriented electrical steel sheet excellent in magnetic properties and adhesion of a primary coating to a base steel sheet, having few defects where the base metal is exposed in point shapes and finish annealing-use steel sheet, an annealing separator, a method for manufacturing grain-oriented electrical steel sheet, and a method for manufacturing finish annealing-use steel sheet.

Solution to Problem

The present invention is characterized by controlling and defining the structure of the interface of a primary coating and a base steel sheet of grain-oriented electrical steel sheet to specify the structure of the primary coating.

In the present invention, based on the shape features shown schematically in FIG. 1, the primary coating is divided into two regions in the thickness direction and the structures at the respective regions are prescribed. In the following explanation, to express the two regions, the surface side will be referred to using the term the "surface oxide layer (1)" and the base steel sheet side will be referred to using the term the "anchoring oxide layer (2)". The surface oxide layer (1) is the region in the thickness direction in which the part of the primary coating covering the surface of the base steel sheet relatively evenly (below, this will sometimes be described as the "surface oxides") is present. The anchoring oxide layer (2) is the region in the thickness direction in which parts of the primary coating penetrating into the base steel sheet (below, this will sometimes be described as the "anchoring oxides") are present. The reference value H0 of the depth dividing the two will be explained later.

In this Description, the structure of the interface will be prescribed by morphological features observing the primary coating from the base steel sheet side. Details will be explained later together with the measurement methods.

Such structures of the interface of the primary coating and the base steel sheet, in particular the characteristic shapes, in general are sometimes expressed using the term "roots".

The interface between the primary coating and base steel sheet of the grain-oriented electrical steel sheet forms uneven shapes in which the anchoring oxides penetrate to the inside of the base steel sheet. If the depth of penetration of the anchoring oxides becomes deeper and the number density of the number of oxide particles ($/\mu m^3$) increases, the adhesion of the primary coating to the base steel sheet rises due to the so-called "anchor effect".

On the other hand, if anchoring oxides penetrate inside of the base steel sheet too much, they will become factors obstructing the crystal grain growth of the steel sheet at the time of secondary recrystallization or the domain wall movement at the time of magnetization and the magnetic properties will deteriorate.

Further, the primary coating has the effect of imparting tension to the steel sheet and lowering the iron loss. To increase the tension, the surface oxide layer (1) in the primary coating is preferably high in content of $Mg_2SiO_4$ with the small coefficient of linear expansion, while the surface oxide layer (1) is preferably thick.

The inventors investigated and studied the magnetic properties of grain-oriented electrical steel sheet comprising elements for improving the magnetic properties and the adhesion of a primary coating formed using an annealing separator comprising Y, La, and Ce and Ca, Sr, and Ba based on the above general assumptions. As a result, the inventors obtained the following findings.

Here, in the following explanation, one or more elements selected from a group comprising Y, La, and Ce will sometimes be described together as "Y group elements" and one or more elements selected from a group comprising Ca, Sr, and Ba will sometimes be described together as "Ca group elements".

If making the annealing separator comprise Y group elements and Ca group elements to form the primary coating, even if the coating adhesion with respect to shearing is sufficient, sometimes the coating adhesion with respect to bending will not be sufficiently obtained. Further, if simultaneously adding the Y group elements and Ca group elements simultaneously in large amounts to improve the coating adhesion with respect to bending, the iron loss and the magnetic flux density sometimes fall.

Further, below, even if increasing the area of the surface of the anchoring oxide layer (2) so as to control the form of the primary coating to raise the coating adhesion, sometimes the primary coating is blown off by the gas produced from the steel sheet during the finish annealing and defects arise where the base metal is exposed in point shapes.

After this, if simply describing "adhesion" other than at locations clearly differentiating between the coating adhesion with respect to shearing and the coating adhesion with respect to bending, it will sometimes be used with the intension of inclusion of coating adhesion with respect to shearing and coating adhesion with respect to bending.

Further, below, when simply referring to "point defects", this is sometimes used intending defects where the primary coating is blown off by the gas produced from the steel sheet during the finish annealing and the base steel sheet being exposed in point shapes.

The inventors further studied the effects of the Y group elements and Ca group elements in the annealing separator and as a result obtained the following findings.

If the annealing separator comprises Y group elements, the anchoring oxide layer (2) becomes thicker. Due to this, the coating adhesion with respect to shearing is improved.

Further, if the annealing separator comprises Ca group elements, the number density of the anchoring oxide layer (2) of the primary coating formed increases and the coating adhesion with respect to shearing is improved. Furthermore, if, as the total content of the Ca group elements prescribed below in the primary coating, making the total content of the Ca group elements comprised as impurities in the raw material powder of MgO and the content derived from compounds of the Ca group elements comprised outside the raw material powder of Mg suitable ratios, the coating adhesion with respect to bending becomes higher, deterioration of the magnetic properties is suppressed, and further point defects are also suppressed. At this time, in the primary coating, the surface oxide layer (1) becomes uniform in thickness and the $Mg_2SiO_4$ phases increase and, further, the anchoring oxide layer (2) becomes longer in longitudinal width direction in addition to the thickness direction. The improvement of the coating adhesion with respect to bending is believed to be caused by the thickness of the surface oxide layer (1) becoming uniform and concentration of local stress at regions of the surface oxide layer (1) which are thin in thickness being avoided at the time of bending operations. Further, the improvement of the magnetic properties is believed to be due to the higher tension acting on the steel sheet due to the increase in the amount of $Mg_2SiO_4$ phases in the surface oxide layer (1).

Further, by suppressing point defects, not only does the area of the interface of the anchoring oxide layer (2) responsible for the adhesion increase, but also the oxides become intertwined in form resulting in a structure with many routes for diffusion of gas. The cause is believed to be the improvement in gas permeability of the anchoring oxide layer (2).

Furthermore, it was clarified that a primary coating having such excellent properties is characterized not only simply by the shapes of the interfacial uneven shapes, but also the form of presence of Al near the interface of the primary coating. Further, the features of the annealing separator used for forming such a primary coating were clarified.

The interface of a base steel sheet and primary coating becomes a complicated three-dimensional shape having uneven shapes such as shown in FIG. 1, so the inventors experimented with prescribing structural features of the interface of the three-dimensional shape. The provisions should inherently quantize the "three-dimensional structures", but this was difficult since they are three-dimensional and complicated structures. For this reason, the inventors experimented with projecting information relating to the interfacial structures on a plane parallel to the surface of the steel sheet such as explained later and prescribing features of the interface at the "plane". Further, it was confirmed that the effect of the present invention can be evaluated and explained by quantitative provisions based on the "features on the projection plane".

The characterizing feature of the present invention obtained by these findings are as follows:

That is, if using an annealing separator having MgO as its main constituent and in which Y group elements and Ca group elements are comprised to form a primary coating having $Mg_2SiO_4$ as its main constituent and comprising Y group elements and Ca group elements, if the primary coating and the interface of the primary coating and base steel sheet satisfy the features shown in the following (1) to (8), the anchoring oxide layer (2) and the surface oxide layer (1) become suitable in form and achievement of both adhesion of the primary coating against shearing and bending and the iron loss characteristic becomes possible.

(1) Number density D3 of number of Al concentrated regions: 0.015 to 0.150/$\mu m^2$, (2) (Area S5 of regions comprised of anchoring oxide layer regions and Al concentrated regions)/(area S3 of Al concentrated regions)≥0.30, (3) Distance H5 of mean value of heights in thickness direction of regions of comprised of anchoring oxide layer regions and Al concentrated regions minus H0: 0.4 to 4.0 μm, (4) (Total perimeter L5 of regions comprised of anchoring oxide layer regions and Al concentrated regions)/(observed area S0): 0.020 to 0.500 $\mu m/\mu m^2$, (5) (Area S1 of anchoring oxide layer regions)/(observed area S0)≥0.15

(6) Total content of Y group elements: 0.1 to 6.0 mass %, (7) Total content of Ca group elements: 0.1 to 6.0 mass %, (8) Number density D4 of Ca group element concentrated regions: 0.005 to 2.000/$\mu m^2$ Further, the finish annealing-use steel sheet for manufacturing the grain-oriented electrical steel sheet satisfies the following condition (9):

(9) Number density D42 of Ca group elements in Ca group element concentrated regions of annealing separator layer: 0.005 to 1.400/$\mu m^3$.

Further, the primary coating and the annealing separator able to form the annealing separator layer satisfy the conditions of the following (10) to (17).

(10) (0.00562[Y]+0.00360[La]+0.00712[Ce])/0.0412 [Mg]×100(%): 0.20 to 1.60%,

(11) (1.40[Ca]+1.18Sr+1.12Ba)/1.66[Mg]×100: 0.20 to 1.80%,

(12) (0.0249[Ca']+0.0114[Sr']+0.0073[Ba'])/0.0412 [Mg']×100: 0.010 to 0.080%,

(13) (12) (10)/(11): 0.020 to 0.200,

(14) Mean particle size R1 of MgO: 0.1 to 2.8 μm,

(15) Mean particle size R2 of particles comprising Ca group elements in the Ca group element concentrated regions: 0.2 to 3.0 m,

(16) (Mean particle size R2)/(mean particle size R1): 0.5 to 3.0.

The gist of the present invention obtained by these findings is as follows:

The grain-oriented electrical steel sheet according to the present invention comprises a base steel sheet having a chemical composition comprising, by mass %, C: 0.0050% or less, Si: 2.5 to 4.5%, Mn: 0.02 to 0.20%, one or more elements selected from the group comprised of S and Se: total of 0.005% or less, sol. Al: 0.010% or less, and N: 0.010% or less and having a balance comprised of Fe and impurities and a primary coating formed on a surface of the base steel sheet and comprising $Mg_2SiO_4$ as a main constituent, where, uneven-shape information of the surface of the primary coating when designating a direction from the primary coating side toward the base steel sheet in the thickness direction of the base steel sheet as positive is laid out projected on a plane parallel to the surface of the steel sheet, when designating the center value of the surface height of the primary coating is H0, the primary coating existing at the base steel sheet side from H0+0.2 μm, is prescribed as the "anchoring oxide layer region" and the primary coating existing at the primary coating side from H0+0.2 μm is prescribed as the "surface oxide layer region", and, in a correlation distribution chart of a characteristic X-ray intensity laying out constituent information in the primary coating projected on a plane parallel to the surface of the steel sheet and uneven shape, a maximum value of the characteristic X-ray intensity of Al is identified and a region where a characteristic X-ray intensity of Al is 20% or more of the maximum value of the characteristic X-ray intensity of Al is obtained as an "Al concentrated region", the primary coating satisfies the conditions of (1) Number density D3 of Al concentrated regions: 0.015 to 0.150/$\mu m^2$, (2) (Area S5 of regions which is anchoring oxide layer regions and is also Al concentrated regions)/(area S3 of Al concentrated regions)≥0.30, (3) Distance H5 of mean value of heights in thickness direction of regions of which is anchoring oxide layer regions and is also Al concentrated regions minus H0: 0.4 to 4.0 μm, (4) (Perimeter L5 of regions which is anchoring oxide layer regions and is also Al concentrated regions)/(observed area S0): 0.020 to 0.500 m/$\mu m^2$, (5) (Area S1 of anchoring oxide layer regions)/(observed area S0)≥0.15

Further, the grain-oriented electrical steel sheet is characterized in that the primary coating comprises one or more elements selected from a group comprising Y, La, and Ce and one or more elements selected from a group comprising Ca, Sr, and Ba, and, when, in the correlation distribution chart of characteristic X-ray intensity and uneven shape, the maximum values of the characteristic X-ray intensities of Ca, Sr, and Ba are identified and a region where a characteristic X-ray intensity of Ca is 20% or more of the maximum value of the characteristic X-ray intensity of Ca, a region where a characteristic X-ray intensity of Sr is 20% or more of the maximum value of the characteristic X-ray intensity of Sr, and a region where a characteristic X-ray intensity of Ba is 20% or more of the maximum value of the characteristic X-ray intensity of Ba are together defined as "Ca group element concentrated regions", the primary coating satisfies the conditions of (6) Ratio of total content of the one or more elements selected from a group comprising Y, La, and Ce to the content of $Mg_2SiO_4$ in the primary coating: 0.1 to 6.0%, (7) Ratio of total content of the one or more elements selected from a group comprising Ca, Sr, and Ba to the content of $Mg_2SiO_4$ in the primary coating: 0.1 to 6.0%, (8) Number density D4 of Ca group element concentrated regions: 0.005 to 2.000/$\mu m^2$.

Further, the finish annealing-use steel sheet for manufacturing the grain-oriented electrical steel sheet comprises a base steel sheet having a chemical composition comprising, by mass %, C: 0.10% or less, Si: 2.5 to 4.5%, Mn: 0.02 to 0.20%, one or more elements selected from the group comprised of S and Se: total of 0.005 to 0.07%, sol. Al: 0.005 to 0.050%, and N: 0.003 to 0.0300% and having a balance comprised of Fe and impurities and an annealing separator layer deposited on a surface of the base steel sheet and comprising MgO as a main constituent, where, when, in the correlation distribution chart of the characteristic X-ray intensity and uneven shape laying out information held by the annealing separator on a plane parallel to a cross-section in the thickness direction of the base steel sheet, the maximum values of the characteristic X-ray intensities of Ca, Sr, and Ba are identified and a region where a characteristic X-ray intensity of Ca is 20% or more of the maximum value of the characteristic X-ray intensity of Ca, a region where a characteristic X-ray intensity of Sr is 20% or more of the maximum value of the characteristic X-ray intensity of Sr, and a region where a characteristic X-ray intensity of Ba is 20% or more of the maximum value of the characteristic X-ray intensity of Ba are together defined as "Ca group element concentrated regions", the annealing separator layer satisfies (9) Number density D42 of particles comprising the one or more elements selected from a group comprising Ca, Sr, and Ba in the Ca group element concentrated regions present in a region of 0 to 3.0 μm from the surface of the base steel sheet: 0.005 to 1.400/$\mu m^3$.

The annealing separator according to the present invention is an annealing separator having MgO as a main constituent, which annealing separator comprises one or more elements selected from a group comprising Y, La, and Ce and one or more elements selected from a group comprising Ca, Sr, and Ba, when defining ratios (%) of contents of Mg, Y, La, Ce, Ca, Sr, and Ba comprised in the annealing separator with respect to the content of the MgO as respectively [Mg], [Y], [La], [Ce], [Ca], [Sr], and [Ba], satisfies

(10) $(0.00562[Y]+0.00360[La]+0.00714[Ce])/0.0412[Mg] \times 100(\%)$: 0.20 to 1.60(%) and

(11) $(0.0249[Ca]+0.0114[Sr]+0.0073[Ba])/0.0412[Mg] \times 100(\%)$: 0.20 to 1.80(%), and when defining ratios (%) of contents of Mg, Ca, Sr, and Ba comprised in the raw material powder of the MgO with respect to the content of the MgO in the raw material powder comprised in the annealing separator as respectively [Mg'], [Ca'], [Sr'], and [Ba'], and satisfies

(12) $(0.0249[Ca']+0.0114[Sr']+0.0073[Ba'])/0.0412[Mg'] \times 100(\%)$: 0.010 to 0.080(%), furthermore

(13) a ratio of $(0.0249[Ca']+0.0114[Sr']+0.0073[Ba'])/0.0412[Mg'] \times 100$ with respect to $(0.0249[Ca]+0.0114[Sr]+0.0073[Ba])/0.0412[Mg] \times 100$ is 0.200 to 0.020, furthermore

(14) a mean particle size R1 of the MgO: 0.1 to 2.8 μm,

(15) a mean particle size R2 of particles comprising the one or more elements selected from a group comprising Ca, Sr, and Ba in the annealing separator: 0.2 to 3.0 μm, and

(16) (mean particle size R2)/(mean particle size R1): 0.5 to 3.0.

The method for manufacturing grain-oriented electrical steel sheet according to the present invention comprises a process for hot rolling a slab comprising, by mass %, C: 0.10% or less, Si: 2.5 to 4.5%, Mn: 0.02 to 0.20%, one or more elements selected from the group comprised of S and Se: total of 0.005 to 0.07%, sol. Al: 0.005 to 0.05%, and N: 0.003 to 0.030% and having a balance comprised of Fe and impurities to manufacture hot rolled steel sheet, a process of cold rolling the hot rolled steel sheet by a cold rolling rate of 80% or more to manufacture cold rolled steel sheet, a process of decarburization annealing the cold rolled steel sheet to manufacture decarburization annealed sheet, a process of coating a surface of the decarburization annealed sheet with an aqueous slurry and drying it, and a process of finish annealing the steel sheet after the aqueous slurry has dried, where the aqueous slurry comprises the above-mentioned annealing separator.

The method for manufacturing finish annealing-use steel sheet for manufacturing grain-oriented electrical steel sheet comprises a process for hot rolling a slab comprising, by mass %, C: 0.1% or less, Si: 2.5 to 4.5%, Mn: 0.02 to 0.20%, one or more elements selected from the group comprised of S and Se: total of 0.005 to 0.07%, sol. Al: 0.005 to 0.05%, and N: 0.003 to 0.030% and having a balance comprised of Fe and impurities to manufacture hot rolled steel sheet, a process of cold rolling the hot rolled steel sheet by a cold rolling rate of 80% or more to manufacture cold rolled steel sheet, a process of decarburization annealing the cold rolled steel sheet to manufacture decarburization annealed sheet, and a process of coating a surface of the decarburization annealed sheet with an aqueous slurry and drying it, wherein the aqueous slurry comprises the above-mentioned annealing separator.

Advantageous Effects of Invention

The grain-oriented electrical steel sheet according to the present invention is excellent in magnetic properties and excellent in adhesion of a primary coating to a base steel sheet. The method for manufacturing grain-oriented electrical steel sheet according to the present invention can manufacture the above-mentioned grain-oriented electrical steel sheet. The annealing separator according to the present invention is applied in the above method of manufacture.

Due to this, the grain-oriented electrical steel sheet of the present invention can be manufactured. The finish annealing-use steel sheet according to the present invention is for manufacturing the grain-oriented electrical steel sheet of the present invention. The method for manufacturing the finish annealing-use steel sheet according to the present invention can manufacture the above finish annealing-use steel sheet.

DESCRIPTION OF EMBODIMENTS

Figures 1, 2:
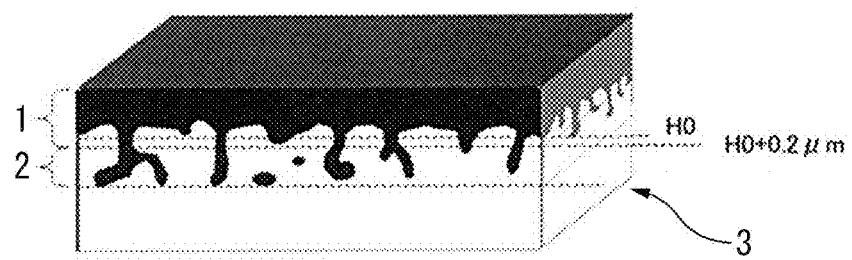
FIG. 1 is a schematic view of a 20 μm×15 μm sample of the primary coating.
FIG. 2 is a view for explaining a Gaussian filter applied to height information data of a primary coating obtained by a laser microscope.

Details will be explained later, but in the present invention, to identify the structures of the interface of the primary coating and base steel sheet of the grain-oriented electrical steel sheet, the surface of the primary coating peeled off from the grain-oriented electrical steel sheet at the side which had been adhered to the base steel sheet, that is, the surface of the primary coating at the side forming the interface of the primary coating and the base steel sheet, is examined. This observed surface is analyzed by a scan type confocal laser microscope to obtain the distribution of uneven shapes at the interface (information of interface in depth direction). Further, the observed surface was analyzed using an SEM-EDS. The distributions of concentration of the various elements present in the primary coating were obtained from the characteristic X-ray intensities. The observations of these equipment are performed in the direction vertical to the surface of the steel sheet peeled from, so the obtained information is information on the primary coating having a three-dimensional structure (uneven shapes and characteristic X-ray intensity) projected on a plane parallel to the surface of the steel sheet.

In the explanation regarding the interface in the Description from here on, it should be noted in advance that the explanation uses the "features on the projection plane". For example, the "area" relating to the structures of the interface is the area obtained on the projection plane. The regions of presence of elements are identified based on the characteristic X-ray intensities of the elements obtained on the projection plane.

However it is confirmed that these features obtained on the projection plane can prescribe well the characterizing features of the present invention. Using the information of the primary coating on the projection plane to explain the present invention needless to say does not cause any loss of significance of the present invention.

Further, in this Description, unless otherwise indicated, further, regarding the numerical values A and B, the expression "A to B" shall mean "A or more and B or less". In this expression, when only the numerical value B is assigned a unit, that unit shall also apply to the numerical value A. Further, in this Description, the "main constituent" means the constituent comprised in 50 mass % or more in a certain substance and preferably means 70 mass % or more, more preferably 90 mass % or more.

Below, the grain-oriented electrical steel sheet according to the present invention and the method for manufacturing grain-oriented electrical steel sheet, the annealing separator used for manufacture of grain-oriented electrical steel sheet, the finish annealing-use steel sheet for manufacturing the grain-oriented electrical steel sheet, and the method for manufacturing the finish annealing-use steel sheet will be explained in detail. In this Description, the "%" regarding the contents of elements will mean "mass %" unless otherwise indicated.

The grain-oriented electrical steel sheet according to one aspect of the present invention is provided with a base steel sheet and a primary coating formed on the surface of the base steel sheet.

Base Steel Sheet

The chemical composition of the base steel sheet forming the above-mentioned grain-oriented electrical steel sheet comprises the following elements. Provided, however, that the characterizing feature of the present invention lies in the primary coating. The base steel sheet does not have to be a special one. Note that, as explained in the following method for manufacture, a base steel sheet is manufactured by cold rolling using hot rolled steel sheet having the later explained chemical composition. Further, there are constituents lost during the finish annealing, so the chemical composition of the base steel sheet forming the grain-oriented electrical steel sheet and the chemical composition of the hot rolled steel sheet greatly differ.

C: 0.0050% or Less

Carbon (C) is an element effective for the microstructure control up to completion of the decarburization annealing in the manufacturing process, but if the content of C is over 0.0050%, the magnetic properties of the grain-oriented electrical steel sheet of the final product sheet fall. Therefore, the content of C is 0.0050% or less. The content of C is preferably as low as possible. However, even if reducing the content of C to less than 0.0001%, the manufacturing costs just build up. The above effect does not change much at all. Therefore, the preferable lower limit of the content of C is 0.0001%.

Si 2.5 to 4.5%

Silicon (S) raises the electrical resistance of steel to reduce the eddy current loss. If the content of Si is less than 2.5%, the above effect is not sufficiently obtained. On the other hand, if the content of Si is over 4.5%, the cold workability of the steel falls. Therefore, the content of Si is 2.5 to 4.5%. The preferable lower limit of the content of Si is 2.6%, more preferably 2.8%. The preferable upper limit of the content of Si is 4.0%, more preferably 3.8%.

Mn: 0.02 to 0.20%

Manganese (Mn) bonds with the later explained S and Se in the manufacturing process to form MnS and MnSe. These precipitates function as inhibitors (inhibitors of normal crystal grain growth) and in steel cause secondary recrystallization. Mn further raises the hot workability of steel. If the content of Mn is less than 0.02%, the above effect is not sufficiently obtained. On the other hand, if the Mn content is over 0.20%, secondary recrystallization does not occur and the magnetic properties of the steel are liable to fall. Therefore, the content of Mn is 0.02 to 0.20%. The preferable lower limit of the content of Mn is 0.03%, more preferably 0.04%. The preferable upper limit of the content of Mn is 0.13%, more preferably 0.1%.

One or More Elements Selected from the Group Comprised of S and Se: Total of 0.005% or Less The sulfur (S) content and selenium (Se) bond with Mn in the manufacturing process to form MnS and MnSe functioning as inhibitors. However, if the contents of these elements are over a total of 0.005%, due to the remaining inhibitors, the magnetic properties fall. Furthermore, due to segregation of S and Se, in grain-oriented electrical steel sheet, sometimes surface defects are caused. Therefore, in grain-oriented electrical steel sheet, the total content of the one or more elements selected from the group comprised of S and Se is 0.005% or less. The total of the contents of S and Se in the grain-oriented electrical steel sheet is preferably as low as possible. However, even if reducing the content of S and the content of Se in the grain-oriented electrical steel sheet to less than 0.0001%, the manufacturing costs just build up. The above effect does not change much at all. Therefore, the preferable lower limit of the total content of the one or more elements selected from the group comprised of S and Se in the grain-oriented electrical steel sheet is 0.0001%.

Sol. Al: 0.010% or Less

Aluminum (Al) bonds with N in the manufacturing process of the grain-oriented electrical steel sheet to form AlN functioning as an inhibitor. However, if the content of sol. Al in the grain-oriented electrical steel sheet is over 0.010%, the above inhibitor excessively remains in the base steel sheet, so the magnetic properties fall. Therefore the content of sol. Al is 0.010% or less. The preferable upper limit of the content of sol. Al is 0.004%, more preferably 0.003%. The content of sol. Al is preferably as low as possible. However, even if reducing the content of sol. Al in the grain-oriented electrical steel sheet to less than 0.0001%, the manufacturing costs just build up. The above effect does not change much at all. Therefore, the preferable lower limit of the content of sol. Al in the grain-oriented electrical steel sheet is 0.0001%. Note that, in this Description, sol. Al means "acid soluble Al". Therefore the content of sol. Al is the content of acid soluble Al.

What to take note of is that, as explained later, the Al of the characterizing feature of the primary coating of the present invention is derived from the base steel sheet. For this reason, at first glance, the fact that the Al content of the base steel sheet is zero would seem to be contradictory to the presence of Al in the primary coating, but what concentrates at the primary coating is the "Al which had been comprised in the base steel sheet in the middle of manufacture". In the grain-oriented electrical steel sheet of the present invention, after concentration of the Al of the characterizing feature of the present invention occurs, the Al of the base steel sheet is discharged to outside the system by the high temperature heat treatment also called "purification annealing" of one process of finish annealing. For this reason, the final base steel sheet not comprising Al and the final primary coating having Al derived from the base steel sheet present are not contradictory.

N: 0.010% or Less

Nitrogen (N) bonds with Al in the manufacturing process of grain-oriented electrical steel sheet to form AlN which functions as an inhibitor. However, if the content of N in the grain-oriented electrical steel sheet is over 0.010%, the above inhibitor excessively remains in the grain-oriented electrical steel sheet, so the magnetic properties fall. Therefore, the content of N is 0.010% or less. The preferable upper limit of the content of N is 0.004%, more preferably 0.003%. The content of N is preferably as low as possible. However, even if reducing the total of the content of N in the grain-oriented electrical steel sheet to less than 0.0001%, the manufacturing costs just build up. The above effect does not change much at all. Therefore, the preferable lower limit of the content of N in the grain-oriented electrical steel sheet is 0.0001%.

The balance of the chemical composition of the base steel sheet of the grain-oriented electrical steel sheet according to the present invention is comprised of Fe and impurities. Here, "impurities" mean the following elements which enter from the ore used as the raw material, the scrap, or the manufacturing environment etc. when industrially manufacturing the base steel sheet or remain in the steel without being completely removed in the purification annealing and which are allowed to be comprised in a content not having a detrimental effect on the action of the grain-oriented electrical steel sheet according to the present invention.

Regarding Impurities

Regarding copper (Cu), tin (Sn), antimony (Sb), bismuth (Bi), tellurium (Te), and lead (Pb), part of the Cu, Sn, and Sb, Bi, Te, and Pb in the base steel sheet is discharged outside of the system by high temperature heat treatment also known as "purification annealing" of one process of the finish annealing. These elements raise the selectivity of orientation of the secondary recrystallization in the finish annealing to exhibit the action of improvement of the magnetic flux density, but if remaining in the base steel sheet after completion of the finish annealing, cause the deterioration of the iron loss as simple impurities. Therefore, the total content of the one or more elements selected from the group comprising Cu, Sn, and Sb, Bi, Te, and Pb is 0.30% or less. As explained above these elements are impurities, so the total content of these elements is preferably as low as possible.

Primary Coating

The characterizing feature of the structure of the primary coating is most important in the present invention. This characterizing feature, as explained before, also includes limitation of the measurement method. In the present invention, information of the interface of the primary coating and base steel sheet is projected on a plane parallel to the surface of the steel sheet and is prescribed on that plane (from here on, sometimes simply described as the "projection plane"). To obtain a grasp of the characterizing feature of the primary coating, understanding the measurement method is considered important, so first the measurement method will be explained.

Method of Measurement of Primary Coating, in Particular Interfacial Structures

Grain-oriented electrical steel sheet with a primary coating formed on its surface is electrolyzed by a constant potential in an electrolytic solution so that only the base steel sheet begins to be dissolved, then the primary coating is separated from the base steel sheet and used as the sample for observation. Note that, in the electrolysis for obtaining the sample, the base steel sheet of the interface is selectively electrolyzed, so there is no need to electrolyze the entire base steel sheet. A suitable amount of electrolysis may be set. The amount of electrolysis is for example 80C per 1 cm$^2$ of the steel sheet area (80 C/cm$^2$). In separation of the primary coating, there is the method of attaching the primary coating on the adhesive surface of a commercially available metal tape etc., then removing the base steel sheet and observing what remains at the tape side, the method of using paraffin to envelop it, then removing the paraffin, etc.

After this, this separated primary coating will sometimes be referred to as the "interface observation sample" and the surface of the primary coating to be observed at the side adhered to the base steel sheet will sometimes be referred to as the "observed surface".

Next, the interface observation sample is observed by various types of observation equipment from a direction vertical to the surface of the steel sheet peeled from (thickness direction of grain-oriented electrical steel sheet). Accordingly, the data obtained from the equipment becomes information of the interface observation sample laid out on a projection plane. The following explanation is given predicated on this data on the projection plane. That is, for example, the description "at the interface" is an explanation of the state of the data on the projection plane. Here, the direction in the thickness direction from the primary coating side to the base steel sheet side is defined as positive. The term "height" used below expresses the direction from the primary coating side toward the base steel sheet side as high.

Regarding the above observed surface of the sample for observation of the interface, a region of 20 µm×15 µm or more is analyzed by a scan type confocal laser microscope (Model No. VK9710, made by Keyence) to obtain uneven shape data of the interface on the projection plane. At this time, the scan steps are made 0.1 µm or less. The obtained 30000 pixels (200 pixels×150 pixels) or more uneven shape data is smoothed once by a size 3×3 Gaussian filter (FIG. 2) one time. Furthermore, the uneven shape data after smoothing was processed by automatic quadric surface correction based on the centerline in the width direction and the centerline in the height direction to lay out the data on the projection plane and obtain the final 200×150 uneven shape distribution chart.

Figure 3:
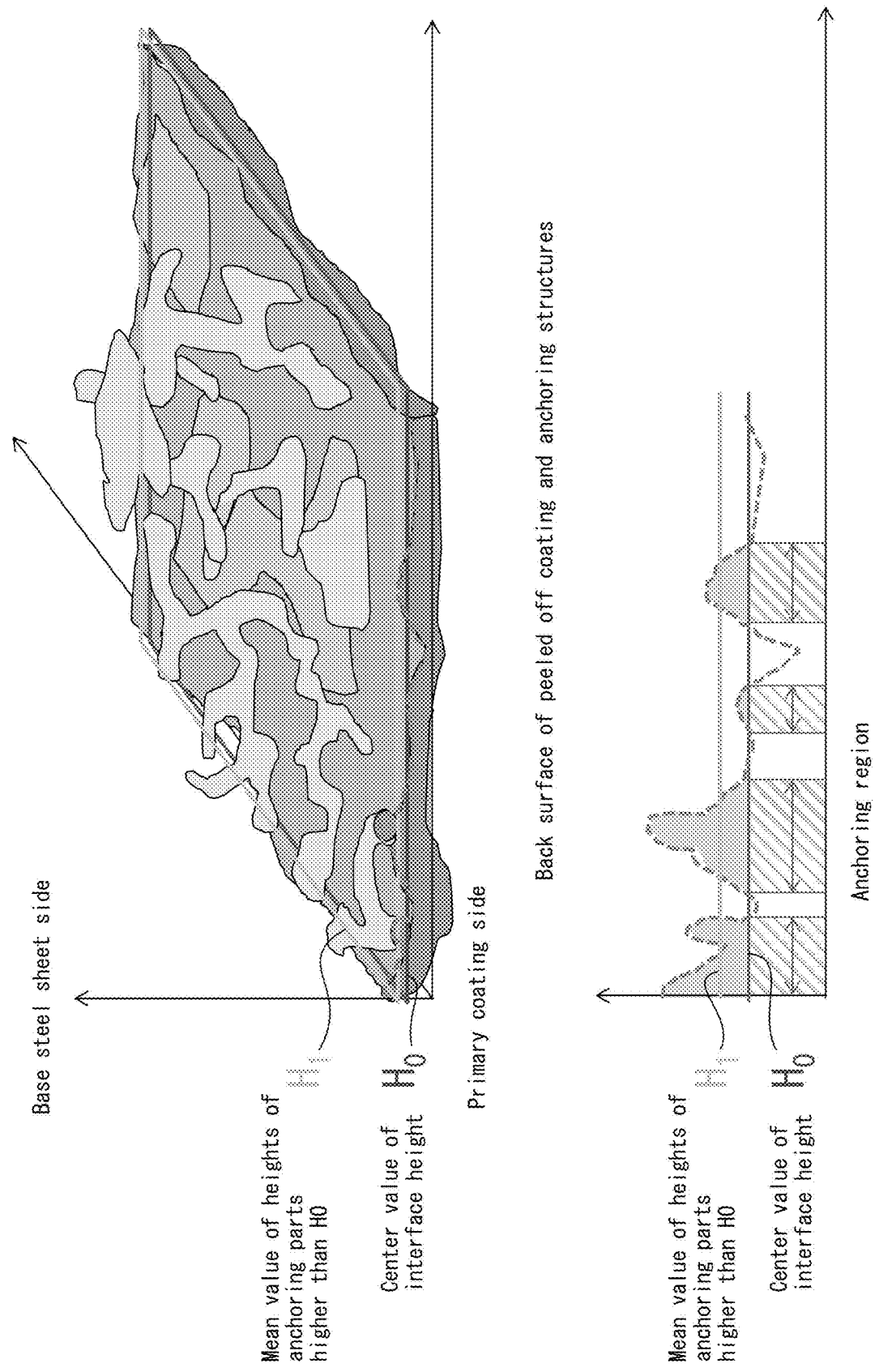
FIG. 3 is a schematic view showing a three-dimensional structure of a back surface and anchoring parts of a peeled off primary coating.

FIG. 3 is a schematic view showing the three-dimensional structure of the back surface of the peeled off primary coating and the anchoring parts. H0 is the center value of surface height of the primary coating. H1 is the mean value of the heights of the anchoring parts present at positions higher than H0. This positions (H1-H0) are, in the present invention, 0.40 to 2.00 µm. FIG. 3 is projected on a plane parallel to the surface of the steel sheet and is a projection plane having uneven shape distribution information of heights.

Figure 4:
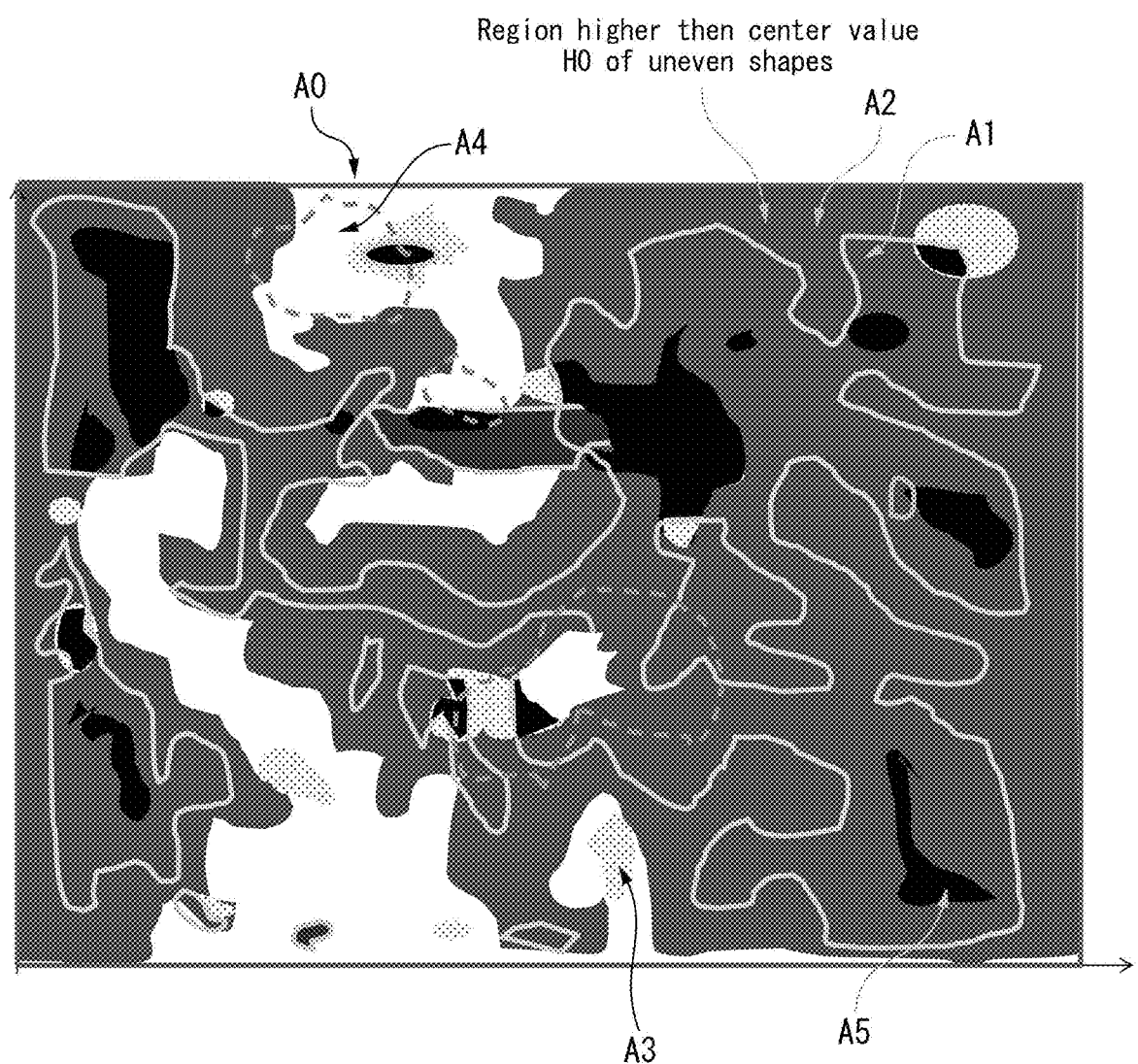
FIG. 4 is a view explaining a correlation distribution chart of characteristic X-ray intensity and uneven shape.

The observed surface of the interface observation sample is analyzed for characteristic X-ray intensities of Ca, Sr, Ba, and Al using a SEM-EDS (model no.: JSM-7900F, made by JEOL). At this time, the scan steps are made 0.1 µm or less and a 200×150 pixel characteristic X-ray intensity distribution chart is obtained on the projection plane. At this time, based on the resolution of the characteristic X-ray intensity distribution chart, a 200×150 pixel or more region is overlaid on a uneven shape distribution chart. That is, it is made to make each pixel of a 200×150 pixel or more region of a digital image of the characteristic X-ray intensity distribution chart correspond to one or more points of the height data of the uneven shape distribution chart of the corresponding region (preferably all of the points). Below, this will be called the characteristic X-ray intensity and uneven shape correlation distribution chart. A schematic view showing this is shown in FIG. 4. The method of identifying the form of the coating using the information obtained from this figure will be explained next.

From the thus obtained characteristic X-ray intensity and uneven shape correlation distribution chart, the following procedure is used to determine the regions A0 to A5 explained below.

In the schematic view of the characteristic X-ray intensity and uneven shape correlation distribution chart shown in FIG. 4, the entire observed region inside the outermost box is shown by A0. The regions colored dark gray are parts higher than the center value H0 of the uneven shapes. The insides of the parts shown by the light gray lines are regions (anchoring oxide regions) A1 a further 0.2 µm higher than H0. The outsides of the parts shown by the light gray lines are the surface oxide layer regions A2. The Al (aluminum) concentrated regions are represented by A3 (shown by dots) and A5 (shown by black). In particular, A5 shows Al (aluminum) concentrated regions present inside the anchoring oxide regions (A1). The regions of A4 (parts inside dotted lines) show the Ca group element concentrated regions explained below.

The region A0 is the observed region as a whole, that is, at least a 20 µm×15 µm or more region. All of the pixels of the characteristic X-ray intensity and uneven shape correlation distribution chart correspond to this region A0. Below, A0 will sometimes be referred to as the "observed region".

The regions A1 and the regions A2 are classified based on the characteristic X-ray intensity and uneven shape correlation distribution chart.

In the present invention, the primary coating is classified into two types of regions in the thickness direction based on the position H0 in the direction of thickness of the steel sheet, that is, the "anchoring oxide layer (2)" and "surface oxide layer (1)", as described above. The regions A1 and the regions A2 are regions with classifications laid out on the projection plane.

H0 is the center value of the surface height of the height data of the characteristic X-ray intensity and uneven shape correlation distribution chart. Here, it is the arithmetic mean value of two height values close to the center of 200×150 pixels. Further, a region of a height of H0+0.2 µm or more is an "anchoring oxide layer (2)" while what is seen on the projection plane is an "anchoring oxide layer region" A1. In the same way, a region of a height of less than H0+0.2 µm is a "surface oxide layer (1)" and is a "surface oxide layer region" A2 on the projection plane.

The regions A3 and the regions A4 are classified based on the characteristic X-ray intensity and uneven shape correlation distribution chart.

In the characteristic X-ray intensity and uneven shape correlation distribution chart, the maximum value of the characteristic X-ray intensity of Al (aluminum) is identified and a region where an intensity of 20% or more of the maximum value of the characteristic X-ray intensity of Al is obtained is designated as A3. Below, a region A3 will be referred to as an "Al concentrated region".

Further, in the characteristic X-ray intensity and uneven shape correlation distribution chart, the characteristic X-ray intensities of Ca, Sr, and Ba are identified and a region combining a region where a characteristic X-ray intensity of Ca of 20% or more of the maximum value of the characteristic X-ray intensity of Ca is obtained, a region where a characteristic X-ray intensity of Sr of 20% or more of the maximum value of the characteristic X-ray intensity of Sr is obtained, and a region where a characteristic X-ray intensity of Ba of 20% or more of the maximum value of the characteristic X-ray intensity of Ba is obtained is A4. That is, a region A4 is a region where the characteristic X-ray intensity of any element of Ca, Sr, and Ba becomes an intensity of 20% or more of the maximum characteristic X-ray intensity of that element. Below, a region A4 will be referred to as a "Ca group element concentrated region".

Furthermore, a region present in the anchoring oxide layer region A1 and comprised of an Al (aluminum) concentrated region A3 is identified as A5. Below, a region A5 will be referred to as an "anchoring Al (aluminum) region".

Next, in the above regions, the number densities of the numbers of the regions (/µm$^2$), the total areas of the regions (µm$^2$), and the positions of the regions in the thickness direction (height (µm)) are identified. The areas are required in the regions A0, A1, A3, and A5. The total areas of the same are designated as S0, S1, S3, and S5.

The number densities of the numbers of the regions are necessary in A3 and A4. The number densities of the regions of A3 and A4 are respectively made D3 and D4. In identification of the number densities of the numbers of regions, a region where pixels continue up and down or left and right in pixel units is deemed a single region. Further, regions comprised of four or more pixels are identified and the number counted. Note that, the area of one pixel is, as explained above, the scan step 0.1 µm at the time of measurement (more specifically, 0.092 m), so the area of the region becomes 0.1 µm×0.1 µm (more specifically, 0.092 µm×0.092 µm)×number of regions.

It goes without saying, but for example D3 is, for the regions A3, the value of the total number of regions measured while deeming regions where pixels continue in pixel units as single regions divided by the area of the observed region A0 (that is, the entire observed area S0). D4 is also calculated by a similar method.

The positions of the regions in the thickness direction are required in the regions A5. The position of a region A5 is designated as H5. Note that, this position is identified based on the H0 of the interface of the surface oxide layer (1) and the anchoring oxide layer (2). Specifically, it is the value of the mean value of heights for all pixels of a region A5 minus H0. A region A5 is a region where the height in the characteristic X-ray intensity and uneven shape correlation distribution chart is a position of H0+0.2 µm or more, so the mean value of the heights of the pixels of a region A5 is always H0+0.2 µm or more. As a result, H5 becomes a value of 0.2 m or more.

Characterizing Feature of Primary coating/Al Distribution Inside Anchoring Oxide Layer Below, the primary coating characterizing the present invention will be explained. The primary coating of the present invention has $Mg_2SiO_4$ as its main constituent, but there is a major characterizing feature in the Al distribution near the interface of the primary coating and the base steel sheet. This feature mainly can be identified in the "anchoring oxide layer (2)", so first the feature relating to the anchoring oxide layer (2) and then the feature of the primary coating as a whole will be explained.

Regarding the above D3 of the number density of Al concentrated regions A3 near the interface, the present invention is characterized in that D3: 0.015 to 0.150/µm$^2$. If D3 is outside this range, the effect of improvement of the coating adhesion with respect to bending cannot be obtained.

Further, the ratio of the perimeter L5 of the regions comprised of the anchoring oxide layer region in the Al concentrated regions, that is, the regions comprised of the anchoring oxide layer region A1 and Al (aluminum) concentrated regions A3 (anchoring Al regions A5), to the observed area, L5/S0, is characterized by being in the range of 0.020 to 0.500 m/µm$^2$. If this ratio becomes less than 0.02 µm µm$^2$, the effect of improvement of the coating adhesion with respect to bending cannot be obtained. Further, if over 0.500 µm/µm$^2$, the iron loss property deteriorates. Here, the perimeter L5 is the total of the perimeters of the anchoring Al regions A5 while the perimeter of the anchoring Al region A5 is the perimeter of the consecutive pixels forming one anchoring Al region A5.

Furthermore, regarding the position H5 in the thickness direction of the anchoring Al regions A5, H5 is characterized by being 0.4 to 4.0 µm. If this value becomes less than 0.4

μm, it is not possible to obtain the effect of improvement of the coating adhesion with respect to bending. Further, if over 4.0 μm, the anchoring oxides are stretched too much more in the thickness direction, so the perimeter is reduced and gas release property is no longer improved and point defects are formed.

The reason why the above Al distribution affects the bendability is not clear, but is believed to be as follows:

Al is an element with a strong tendency to form oxides, so during finish annealing, at the surface of the steel sheet, Al is selectively oxidized and Al diffuses from the inside of the base steel sheet toward the surface. At this time, at the surface oxides formed by the reaction of the annealing separator, if part is replaced with $MgAl_2O_4$, $Mg_2 SiO_4$ is reduced formed, the amount falls, the linear expansion coefficient rises, and the magnetic properties are degraded. Also, the surface oxide layer (1) mainly comprised of $Mg_2 SiO_4$ becomes uneven in thickness. To avoid this, Al may be made to oxidize inside of the steel sheet to prevent it from reaching the surface oxide layer (1). That is, the present invention is considered to achieve both improvement of the magnetic properties and improvement of the coating adhesion with respect to bending by making the structure one in which Al oxides are formed at the front end positions of the anchoring oxides deeply penetrating into the base steel sheet.

The prescribed value expressing this state is H5. In the present invention, H5 is 0.4 μm or more. That is, it is considered that the above structure is achieved by forming anchoring Al regions at positions inside of the steel sheet separated from H0 by 0.4 μm or more (front end sides of anchoring oxides) and making the perimeters L5 of the anchoring Al regions per observed area 0.02 μm or more.

Further, saying that such anchoring Al regions A5 are present at the front ends of the anchoring oxides means consequently that D3 becomes a suitable range of values. That is, if the number density of the anchoring Al regions A5 is small, D3 becomes low. Further, even if a situation temporarily arises where the anchoring Al regions become excessively high in density, since the distance between the adjacent anchoring Al regions A5 becomes shorter, these will end up merging along with growth of the primary coating and finally it will become hard for D3 to become an excessively high value.

Further, if the above-mentioned suitable anchoring Al regions A5 are formed, the Al diffusing from the inside of the steel sheet no longer reaches the surface oxide layer (1), so S5/S3 inevitably becomes a high value.

Note that, in the present invention, the state of Al in the Al concentrated regions A3 is not prescribed at all, but if considering the fact that the main constituent of the primary coating is $Mg_2 SiO_4$, it is appropriate to think that the Al in A3 is present as an oxide.

Characterizing Feature of Primary Coating/Existence of Anchoring Oxide Layer Regions In the primary coating of the present invention, it cannot be said that the shape of the anchoring oxide layer (2) has remarkable characterizing features in terms of external shape, but the above-mentioned characterizing Al distribution utilizes phenomena at the front end regions of the anchoring oxide layer (2), so if the anchoring oxides themselves are not present, formation of the characterizing Al distribution also becomes difficult.

For this reason, the presence of anchoring oxides is prescribed and the ratio of the areas of anchoring oxide layer regions on the projection plane is prescribed. Note that, the numerical range itself of this provision is one of an extent observed even in grain-oriented electrical steel sheet excellent in coating adhesion in a general shearing operation, but can also be said to be important as an essential condition for obtaining the characterizing Al distribution.

In the present invention, it is necessary that (the area S1 of anchoring oxide layer regions)/(observed area S0)≥0.15. This value becoming less than 0.15 means that even if each single anchoring oxide is formed over a considerable area, the number density of the number of anchoring oxides is extremely low or even if the number density is a certain extent of value, the area of each single anchoring oxide is small. In either case, it expresses the state where the interval between the anchoring oxides becomes relatively broad. Details will be explained later, but under such a situation, it becomes difficult to form the above-mentioned characterizing Al distribution.

Characterizing Feature of Primary coating/Composition of Primary coating and Distribution of Ca Group Elements The primary coating of the present invention has forsterite ($Mg_2 SiO_4$) as a main constituent. More specifically, the primary coating comprises 50 to 95 mass % of $Mg_2 SiO_4$. The remaining part is mainly the generally known $MgAl_2O_4$ and other oxides or MnS or alkali earth metal sulfides.

Furthermore, the primary coating of the present invention comprises Y group elements in a total of 0.1 to 6.00 mass % and Ca group elements in a total of 0.1 to 6.00 mass % with respect to the content of $Mg_2 SiO_4$ in the primary coating.

Details will be explained later, but to realize the above-mentioned distribution of oxides of Al, it is preferable to use an annealing separator comprising Y group elements. In this case, Y group elements remain in the primary coating after the finish annealing as well. If the total content of the Y group elements in the primary coating is less than 0.1 mass %, it cannot be said that the content of Y group elements at the annealing separator is sufficient and the coating adhesion with respect to bending is not improved. If over 6.0 mass %, the anchoring oxide layer (2) becomes too great in thickness and the oxides obstruct domain wall movement at the time of magnetization, so the detrimental effects on the magnetic properties become remarkable.

In the same way, to realize the above-mentioned distribution of oxides of Al, it is preferable to use an annealing separator comprising Ca group elements. In this case, Ca group elements also remain in the primary coating after the finish annealing. With a total content of Ca group elements in the primary coating of less than 0.1 mass %, it cannot be said that the content of Ca group elements at the annealing separator is sufficient. It is not possible to raise the coating adhesion in a bending operation. With over 6.0 mass %, the number density of the anchoring oxide layer (2) becomes too high and the adjacent anchoring oxides join and form integral particles, so as a result the number density of the anchoring oxide particles fall. Not only that, the characterizing Al distribution cannot be obtained and the coating adhesion in a bending operation cannot be raised.

The content of $Mg_2 SiO_4$ in the primary coating is obtained by using the primary coating separated from the electrical steel sheet by the above method as a sample and quantitatively analyzing the Mg in the sample by the induction coupling plasma mass spectrometry (ICP-MS). The product of the obtained quantized value (mass %) and the molecular weight of the $Mg_2 SiO_4$ divided by two times the atomic weight of Mg is made the content of $Mg_2 SiO_4$.

Further, in the same way, Ca, Ba, and Sr and La, Y, and Ce are quantitatively analyzed by a method similar to the above. The obtained contents (mass %) are calculated in the same way as the above to calculate the contents of these elements. The total of the obtained contents of Ca, Ba, and Sr is defined as the "content of Ca group elements" and the total of the obtained contents of La, Y, and Ce is defined as the "content of Y group elements".

Further, in the primary coating of the present invention, the "number density of the Ca group element concentrated regions" D4 on the projection plane is preferably $0.005/\mu m^2$ or more. Details will be explained later, but the Ca group elements which the annealing separator comprises are believed to play an important role in controlling the number density of anchoring oxides in the process of formation of the primary coating. The number density D4 of the Ca group element concentrated regions A4 at the primary coating prescribed here is believed to express the mode when Ca group elements acting to form anchoring oxides in the process of formation of the primary coating remain in the primary coating. If D4 becomes high, the Ca group elements are evenly supplied to the anchoring oxides, so the number density D3 of the Al-based oxides becomes higher and penetration of the anchoring oxides to the inside of the base steel material is promoted.

If D4 becomes less than $0.005/\mu m^2$, the number density of the anchoring oxide particles cannot be sufficiently obtained and the adhesion is not improved. Not only that, the above characterizing Al distribution cannot be obtained.

The upper limit is not particularly set, but if D4 is too high, the frequency of formation of the anchoring oxide particles formed in relation to this also becomes excessively high and the adjacent anchoring oxides join and form integral particles, so formation of the characterizing Al distribution is impaired, as explained above. For this reason, D4 is preferably $2.000/\mu m^2$ or less.

Method of Manufacture

One example of the method for manufacturing grain-oriented electrical steel sheet according to the present invention will be explained.

One example of the method for manufacturing grain-oriented electrical steel sheet is provided with a steelmaking process, hot rolling process, hot rolled sheet annealing process, cold rolling process, decarburization annealing process, finish annealing process, flattening annealing process, coating baking process, and domain wall control process. Below, the processes will be explained. Note that the treatment conditions of the following processes are not off from the general ranges and do not have to be special ones. In the method of the present invention, the characterizing feature is the state of the surface of the steel sheet comprising the annealing separator in the steel sheet before finish annealing for controlling the structure of the primary coating.

Steelmaking Process

In the steelmaking process, molten steel is produced by a converter or other ordinary method and a known refining process and casting process are performed to manufacture a slab having the next chemical composition. Note that the elements of the chemical composition of the slab are removed to a certain extent from the steel constituents in the later explained finish annealing. In particular, the S, Al, N, etc. functioning as inhibitors are greatly removed. For this reason, the chemical composition of the slab described here differs from the chemical composition of the steel sheet of the final product.

C: 0.1% Mass or Less,

If the content of C is over 0.1 mass %, the time required for the decarburization annealing becomes longer. In this case, the manufacturing costs rise and the productivity falls. Therefore, the content of C in the slab is 0.1 mass % or less.

The preferable upper limit of the content of C in the slab is 0.092 mass %, more preferably 0.085 mass %. Further, if the content of C is lower than 0.005 mass %, the state of dispersion of the MnS, MnSe, AlN, and other precipitates and also the particle structure of the steel sheet after the decarburization annealing will not become uniform and the degree of integration to the Goss orientation after secondary recrystallization may be degraded. Therefore, the lower limit of the content of C in the slab is 0.005 mass %. The preferable lower limit of the content of C in the slab is 0.02 mass %, more preferably 0.04 mass %.

Si: 2.5 to 4.5 Mass %,

As explained in the section on the chemical composition of the grain-oriented electrical steel sheet of the finished product, Si raises the electrical resistance of steel, but if excessively present, the cold workability falls. If the content of S in the slab is 2.5 to 4.5 mass %, the content of Si of the grain-oriented electrical steel sheet after the finish annealing process becomes 2.5 to 4.5 mass %. The preferable upper limit of the content of Si in the slab is 4.0%, more preferably 3.8 mass %. The preferable lower limit of the content of Si in the slab is 2.6 mass %, more preferably 2.8 mass %.

Mn: 0.02 to 0.20 Mass %

As explained in the section on the chemical composition of the grain-oriented electrical steel sheet of the finished product, in the manufacturing process, Mn bonds with S and Se to form precipitates which function as inhibitors. Mn further raises the hot workability of steel. If the content of Mn in the slab is 0.02 to 0.20%, the Mn content of the grain-oriented electrical steel sheet after the finish annealing process becomes 0.05 to 0.20 mass %. The preferable upper limit of the content of Mn in the slab is 0.13%, more preferably 0.10%. The preferable lower limit of the content of Mn in the slab is 0.03%, more preferably 0.04%.

One or More Elements Selected from Group Comprised of S and Se: Total of 0.005% to 0.070%

Sulfur (S) and selenium (Se) bond with Mn in the manufacturing process to form MnS and MnSe. MnS and MnSe both function as inhibitors required for suppressing crystal grain growth in the secondary recrystallization. If the total content of the one or more elements selected from the group comprised of S and Se is less than 0.005% mass, the above effect is hard to obtained. On the other hand, if the total content of the one or more elements selected from the group comprised of S and Se is over 0.070 mass %, secondary recrystallization does not occur in the manufacturing process and the magnetic properties of the steel fall. Therefore, in the slab, the total content of the one or more elements selected from the group comprised of S and Se is 0.005 to 0.070%. The preferable lower limit of the total content of the one or more elements selected from the group comprised of S and Se is 0.008%, more preferably 0.016%. The preferable upper limit of the total content of the one or more elements selected from the group comprised of S and Se is 0.060%, more preferably 0.050%.

Sol. Al: 0.005 to 0.050 Mass %

Aluminum (Al) bonds with N in the manufacturing process to form AlN. AlN functions as an inhibitor. If the content of sol. Al in the slab is less than 0.005%, the above effect is not obtained. On the other hand, if the content of sol. Al in the slab is over 0.050 mass %, the AlN coarsens. In this case, it becomes difficult for the AlN to function as an inhibitor and sometimes secondary recrystallization is not caused. Therefore, the content of sol. Al in the slab is 0.005 to 0.050%. The preferable upper limit of the content of sol. Al in the slab is 0.040%, more preferably 0.035%. The preferable lower limit of the content of sol. Al in the slab is 0.010%, more preferably 0.015%.

N: 0.0030 to 0.0300 Mass %

In the manufacturing process, nitrogen (N) bonds with Al to form AlN functioning as an inhibitor. If the content of N in the slab is less than 0.0030 mass %, the above effect is not obtained. On the other hand, if the content of N in the slab is over 0.0300 mass %, the AlN coarsens. In this case, it becomes difficult for the AlN to function as an inhibitor and sometimes secondary recrystallization is not caused. Therefore, the content of N in the slab is 0.0030 to 0.0300%. The preferable upper limit of the content of N in the slab is 0.0200 mass %, more preferably 0.0150%. The preferable lower limit of the content of N in the slab is 0.0040%, more preferably 0.0060%.

The balance of the chemical composition in the slab of the present invention is comprised of Fe and impurities. Here, "impurities" mean elements which enter from the ore used as the raw material, the scrap, or the manufacturing environment etc. when industrially manufacturing the slab and which are allowed to be comprised in a range not having a detrimental effect on the slab of the present embodiment.

Regarding Optional Elements

The slab according to the present invention may further comprise, in place of part of the Fe, one or more elements selected from the group comprising Cu, Sn, and Sb in a total of 0.60 mass % or less. These elements are all optional elements.

One or More Elements Selected from Group Comprised of Cu, Sn and Sb: Total of 0 to 0.60 Mass % copper (Cu), tin (Sn), and antimony (Sb) are all optional elements and need not be comprised. If comprised, Cu, Sn, and Sb all raise the magnetic flux density of grain-oriented electrical steel sheet. If Cu, Sn, and Sb are comprised even a little, the above effect is obtained to a certain extent. However, if the contents of Cu, Sn, and Sb are over a total of 0.6%, it becomes difficult for an internal oxide layer to be formed at the time of decarburization annealing. In this case, at the time of the finish annealing, the formation of the primary coating, which proceeds with the reaction of MgO of the annealing separator and the $SiO_2$ of the internal oxide layer, is delayed. As a result, the adhesion of the primary coating formed falls. Further, after purification annealing, Cu, Sn, and Sb easily remain as impurity elements. As a result, the magnetic properties deteriorate. Therefore, the content of the one or more elements selected from the group comprised of Cu, Sn, and Sb is a total of 0 to 0.6 mass %. The preferable lower limit of the total content of one or more elements selected from the group comprised of Cu, Sn, and Sb is 0.005 mass %, more preferably 0.007 mass %. The preferable upper limit of the total content of one or more elements selected from the group comprised of Cu, Sn, and Sb is 0.50 mass %, more preferably 0.45 mass %.

The slab according to the present invention may further comprise, in place of part of the Fe, one or more elements selected from the group comprised of Bi, Te, and Pb in a total of 0.030 mass % or less. These elements are all optional elements.

One or More Elements Selected from Group Comprising Bi, Te, and Pb: Total of 0 to 0.030%

Bismuth (Bi), tellurium (Te), and lead (Pb) are all optional elements, but are elements which should be taken note of in the present invention from the following viewpoint.

These elements raise the magnetic flux density of grain-oriented electrical steel sheet. The preferable lower limit value of the total content of the one or more elements selected from the group comprised of Bi, Te, and Pb for this is 0.0005 mass %, more preferably 0.001 mass %.

On the other hand, if, at the time of the finish annealing, these elements segregate at the surface, the anchoring oxide layer (2) will not become thicker, and coating adhesion of the primary coating will fall. For this reason, despite having the effect of raising the magnetic flux density, for securing the coating adhesion, the amount of addition had to be limited to 0.005 mass % or so or less. The effect of the present invention becomes particularly effective when changing the structure of the anchoring oxides to improve the coating adhesion, so becomes particularly effective if applying the method of manufacture comprising these elements. In the case of application of the present invention, excellent coating adhesion becomes able to be secured even by these elements in 0.010 mass % or more, more preferably 0.015 mass % or more. This being said, if excessively comprising this, it is not possible to avoid a drop in adhesion even by the effect of the present invention, so the upper limit is made 0.030 mass %. The preferable upper limit is 0.020%, while the more preferable upper limit is 0.015%.

Hot Rolling Process

The slab having the above-mentioned chemical composition is heated. The heating temperature of the slab is, for example, over 1280° C. to 1350° C. or less. The heated slab is hot rolled to manufacture the hot rolled steel sheet. The hot rolled steel sheet may be annealed as required. The conditions of the annealing of the hot rolled steel sheet are for example 900 to 1100° C. for 3 to 5 minutes.

Cold Rolling Process

In the cold rolling process, hot rolled steel sheet is cold rolled to manufacture cold rolled steel sheet.

The prepared hot rolled steel sheet is cold rolled to produce the cold rolled steel sheet of the base steel sheet. The cold rolling may be performed only one time or may be performed several times. If performing cold rolling several times, after performing cold rolling, process annealing is performed for purpose of softening the steel, then cold rolling is performed. By performing cold rolling one time or several times, cold rolled steel sheet having the finished product thickness (thickness of finished product) is manufactured.

The cold rolling rate in the one time or several times of cold rolling is 80% or more. Here, the cold rolling rate (%) is defined as follows:

Cold rolling rate (%)={1−(thickness of cold rolled steel sheet after final cold rolling)/(thickness of hot rolled steel sheet before start of initial cold rolling)}×100

Note that, the preferable upper limit of the cold rolling rate is 95%. Further, before cold rolling the hot rolled steel sheet, the hot rolled steel sheet may be heat treated or may be pickled.

Decarburization Annealing Process

The cold rolled steel sheet manufactured by the cold rolling process is decarburization annealed and nitridation annealed in accordance with need. The decarburization annealing is performed in a known hydrogen-nitrogen wet atmosphere. Due to the decarburization annealing, the concentration of C of the grain-oriented electrical steel sheet is decreased to 50 ppm or less able to suppress magnetic aging deterioration. In the decarburization annealing process, primary recrystallization occurs in the structure of the steel sheet and the working strain introduced by the cold rolling is released. Furthermore, in the decarburization annealing process, the surface layer part of the base steel sheet is formed with an internal oxide layer having $SiO_2$ as its main constituent. The $SiO_2$ formed here reacts with the MgO in the aqueous slurry comprising the annealing separator to be coated later during the finish annealing to form a primary coating controlled in form in the present invention. The annealing temperature of the decarburization annealing process is known, for example, is 750 to 950° C. The holding time at that annealing temperature is for example 1 to 5 minutes.

Annealing Separator Layer Forming Process

In the present invention, the "annealing separator" indicates a substance formed for imparting the function of preventing sticking during finish annealing to the surface of the decarburization annealed sheet on which finish annealing is to be performed. Further, the layer of the annealing separator formed on the surface of the decarburization annealed sheet is called the "annealing separator layer".

In this process, an aqueous slurry comprising the compounds forming the annealing separator etc. is prepared. The aqueous slurry is prepared by adding to pure water the later explained elements forming the annealing separator etc. as compounds etc. and stirring. This slurry is coated on the surface of the above decarburization annealed sheet by a roll coater, spray, etc. The steel sheet on which the slurry is coated is inserted into a furnace held at 400 to 1000° C. and held there for 10 to 90 seconds to thereby dry the slurry of the surface. Note that, at this time, the temperature of the steel sheet itself only rises to 400° C. or so (no change in crystal structure such as recrystallization occurs). What remains at the surface of the steel sheet at this point of time is the annealing separator in the present invention. The state of this annealing separator deposited on the surface of the steel sheet before finish annealing is called an "annealing separator layer".

Basically, finally, the annealing separator covering the surface of the steel sheet before the finish annealing may be considered to be obtained by simply mixing the various compounds etc. used as the raw materials.

Finish Annealing Process

The annealing separator is dried, then the finish annealing is performed. In the finish annealing, the annealing temperature is made 1150 to 1250° C. and the base steel sheet (cold rolled steel sheet) is soaked. The soaking time is for example 15 to 30 hours. The furnace atmosphere in the finish annealing is a known atmosphere. Note that, in the final process of the finish annealing process, in particular, parts of the S, Al, N, and other elements functioning as inhibitors are discharged to outside the system. This process is sometimes called "purification (annealing)".

In the grain-oriented electrical steel sheet manufactured by the above manufacturing process, a primary coating comprising $Mg_2 SiO_4$ as a main constituent is formed on the surface. At this time, by applying the later explained annealing separator, the interfacial structure of the base steel sheet and the primary coating satisfies the provisions of the present invention and the coating adhesion is improved.

Note that, due to the decarburization annealing process and the finish annealing process, elements of the chemical composition of the hot rolled steel sheet are removed to a certain extent from the constituents of the steel. In particular, the S, Al, N, etc. functioning as inhibitors are greatly removed. For this reason, compared with the chemical composition of the hot rolled steel sheet, the contents of the elements in the chemical composition of the base steel sheet of the grain-oriented electrical steel sheet become lower as explained above. If using the hot rolled steel sheet of the above-mentioned chemical composition to work the above method of manufacture, an grain-oriented electrical steel sheet having a base steel sheet of the above chemical composition can be manufactured.

Insulating Coating Forming Process

In one example of the method for manufacturing the grain-oriented electrical steel sheet according to the present invention, further a process for forming an insulating coating may be performed after the finish annealing process. In the process for formation of an insulating coating, the surface of the grain-oriented electrical steel sheet after lowering the temperature in the finish annealing is coated with an insulating coating agent mainly comprised of colloidal silica and a phosphate, then baked. Due to this, the primary coating is formed with an insulating coating of the tension coating.

Magnetic Domain Refining Treatment Process

The grain-oriented electrical steel sheet according to the present invention may furthermore be subjected to a known process of treatment for refining the magnetic domains after the cold rolling, after the decarburization annealing, after the finish annealing, after the formation of the insulating costing, etc. In the process for refining the magnetic domains, the surface of the grain-oriented electrical steel sheet is irradiated by a laser beam having the effect of refining the magnetic domains or formed with grooves on the surface. In this case, grain-oriented electrical steel sheet further excellent in magnetic properties can be manufactured.

Annealing Separator

The annealing separator of the present invention has magnesium oxide (MgO) as its main constituent and further comprises one or more elements selected from a group comprising Y, La, and Ce (Y group elements) and one or more elements selected from a group comprising Ca, Sr, and Ba (Ca group elements).

Y, La, and Ce

In the annealing separator, the ratios of the contents of Y, La, Ce, and Mg with respect to the content of MgO in the annealing separator are expressed by % and designated as [Y], [La], [Ce], and [Mg]. The annealing separator comprises these elements satisfying the following formula:

$$(0.00562[Y]+0.00360[La]+0.00712[Ce])/0.0412$$
$$[Mg] \times 100(\%): 0.20 \text{ to } 1.60(\%)$$

Here the coefficients in the above formula are coefficients for finding the ratios of existence and are calculated as follows in the belief that the Y, La, Ce, and Mg atoms present in the annealing separator are respectively comprised as the stable oxides $Y_2O_3$, $La_2O_3$, $CeO_2$ and MgO:

Coefficient of Y: 1/atomic weight of Y/2=1/88.9/2=0.00562

Coefficient of La: 1/atomic weight of La/2=1/138.9/2=0.00360

Coefficient of Ce: 1/atomic weight of Ce=1/140.1=0.00714

Coefficient of Mg: 1/atomic weight of Mg=1/24.3=0.0412

$(0.00562[Y]+0.00360[La]+0.00714[Ce])/0.0412[Mg] \times 100$ is the ratio (percentage) of the content obtained by converting the Y group elements in the annealing separator to stable oxides of the elements and totaling them up and the main constituent substance MgO in the annealing separator. In other words, it can be said to be an indicator showing the magnitude of the effect of the Y group elements on the Mg in the oxides. Below, $(0.00562[Y]+0.00360[La]+0.00714[Ce])/0.0412[Mg] \times 100$ will be referred to as "CY".

Note that, the Y group elements have to be comprised as compounds including oxygen or as compounds changing to compounds comprising oxygen by oxidation in the finish annealing.

The compounds of the Y group elements are for example oxides or are hydroxides, carbonates, sulfates, etc. changing to oxides in part or whole by the later explained baking treatment (drying treatment) and finish annealing treatment.

In the annealing separator to which the compound of Y group elements is added, the roots of the primary coating develop due to the later explained effect of release of oxygen. As a result, the adhesion of the primary coating with the base steel sheet rises. If CY is less than 0.20%, the above effect is not sufficiently obtained. On the other hand, if CY is over 1.60%, the roots of the primary coating excessively develop and the magnetic properties fall. Therefore, CY is 0.20 to 1.60%. The preferable lower limit of CY is 0.40%, more preferably 0.50%. The preferable upper limit is 1.40%, more preferably 1.30%.

The reason why controlling the content of Y group elements enables the adhesion to be improved is not completely clear, but is believed to be as follows: That is, Y group elements comprising oxygen release oxygen during the finish annealing, maintain the oxygen partial pressure between steel sheets of a coil during finish annealing, and make the anchoring oxide layer (2) of the primary coating grow. Below, the relationship between the release of oxygen and the development of the anchoring oxide layer (2) will be explained in detail.

The anchoring oxide layer is comprised of the MgO in the annealing separator and the $Mg_2SiO_4$ formed by reaction with the $SiO_2$ inside the base steel sheet. That is, to obtain an anchoring structure with prominent uneven shapes, it is necessary that the oxides inside the steel sheet, that is, the $SiO_2$, inherently have prominent uneven shapes. $SiO_2$ having such interfaces have high interfacial energy, so are unstable during the finish annealing performed at a high temperature. For this reason, during the finish annealing, the $SiO_2$ formed at the inside of the base steel sheet breaks down and diffuses as Si and O in the base steel sheet thereby becoming flat. Furthermore, the finish annealing is performed in a hydrogen atmosphere, so the supply of oxygen to the inside of the base steel sheet is small. In addition, Al-based oxides, which are oxides stabler than $SiO_2$, are formed, whereby the oxygen in the base steel sheet decreases and the $SiO_2$ becomes increasingly unstable. As a result, the $SiO_2$ present inside the base steel sheet at a depth deeper than where the Al-based oxides are formed remarkably breaks down. $SiO_2$ becomes increasingly flat through the diffusion after break down and the anchoring oxide layer (2) of the primary coating also becomes flat.

Here, the Y group elements comprising oxygen comprised in the annealing separator release oxygen, whereby the oxygen partial pressure between the steel sheets of the coil during finish annealing becomes higher. Due to the higher oxygen partial pressure between the steel sheets, oxygen is supplied into the base steel sheet and flattening of the internal $SiO_2$ oxides is delayed. Delay of flattening of the $SiO_2$ during the finish annealing means formation of $Mg_2SiO_4$ with prominent uneven shapes. $Mg_2SiO_4$ is stabler than $SiO_2$. There is little change of form due to the subsequent finish annealing. As a result, the uneven shapes of the anchoring oxide layer (2) of the primary coating become prominent.

Ca, Sr, and Ba

In the present invention, the total content of the Ca group elements comprised in the annealing separator, the total content of the Ca group elements comprised as impurities in the MgO raw material powder comprised in the, annealing separator, and the ratio of these contents are prescribed.

In the annealing separator, the ratios of the contents of Ca, Sr, Ba, and Mg with respect to the content of MgO in the annealing separator are expressed by % and designated as [Ca], [Sr], [Ba], and [Mg]. The annealing separator comprises these elements satisfying the following formula:

$$(0.0249[Ca]+0.0114[Sr]+0.0073[Ba])/0.0412[Mg]\times 100(\%)=0.20 \text{ to } 1.80(\%)$$

Further, the contents of Ca, Sr, Ba, and Mg comprised in the MgO raw material powder with respect to the content of MgO in the MgO raw material powder comprised in the annealing separator are designated as [Ca'], [Sr'], [Ba'], and[Mg']. The annealing separator comprises these elements satisfying the following formula:

$$(0.0249[Ca']+0.0114[Sr']+0.0073[Ba'])/0.0412[Mg']\times 100(\%): 0.010 \text{ to } 0.080(\%)$$

Furthermore, the total content of Ca group elements comprised in the annealing separator and the total content of the Ca group elements in the MgO raw material powder comprised in the annealing separator satisfy the relationship of (total content of Ca group elements of MgO raw material powder comprised in annealing separator)/(total content of Ca group elements comprised in annealing separator): 0.020 to 0.200.

Here, the coefficients in the above formula are coefficients calculated thinking of the Ca, Ba, Sr, and Mg atoms present in the annealing separator or MgO raw material powder being respectively comprised as the stable oxides CaO, BaO, SrO, and MgO and can be calculated as follows by coefficients calculated by the respective abundance ratios:

Coefficient of Ca: 1/atomic weight of Ca=1/40.1=0.0249
Coefficient of Sr: 1/atomic weight of Sr=1/87.6=0.0114
Coefficient of Ba: 1/atomic weight of Ba=1/137.3=0.0073
Coefficient of Mg: 1/atomic weight of Mg=1/24.3=0.0412
$(0.0249[Ca]+0.0114[Sr]+0.0073[Ba])/0.0412[Mg]\times 100$ (%) is the ratio (percentage) of the content obtained by converting the Ca group elements in the annealing separator to stable oxides of the elements and totaling them up and the main constituent substance MgO in the annealing separator. In other words, it can be said to be an indicator showing the magnitude of the effect of the Ca group elements on the Mg in the oxides. Below, the total abundance ratio of the Ca group elements comprised in the annealing separator $(0.0249[Ca]+0.0114[Sr]+0.0073[Ba])/0.0412[Mg]\times 100(\%)$ will be referred to as "CC" and the total abundance ratio of the Ca group elements comprised as impurities in the MgO raw material powder comprised in the annealing separator $(0.0249[Ca']+0.0114[Sr']+0.0073[Ba'])/0.0412[Mg']\times 100$ (%) will be referred to as "CC'".

The Ca group elements are for example oxides or are hydroxides, carbonates, sulfates, etc. changing to oxides in part or whole by the later explained baking treatment (drying treatment) and finish annealing treatment.

The Ca group elements are believed to diffuse in the primary coating during the finish annealing to reach the interface of the primary coating at the base steel sheet side and react with the $SiO_2$ present at the surface region of the base steel sheet becoming starting points for formation of the primary coating so make formation of anchoring oxides easier, that is, for making the number density of the number of the anchoring oxide layer regions increase.

The reason why such an action is exhibited is not clear, but is believed to be as follows.

The base steel sheet oxidized by the decarburization annealing. At the surface layer region, $SiO_2$ is formed. Growth of the anchoring oxides, part of the primary coating mainly comprised of $Mg_2SiO_4$, to the inside of the base steel sheet, that is, the phenomenon of the increase of thickness of the anchoring oxide layer (2), is the phenomenon of the Mg comprised as a main element of the annealing separator diffusing toward the $SiO_2$ at the inside of the base steel sheet and forming $Mg_2SiO_4$. At the same time, the Al concentrated regions characterizing the present invention are believed to be formed by the Al diffusing from the inside of the steel sheet reacting with the $Mg_2SiO_4$ and concentrating at that region. That is, the more $Mg_2SiO_4$ is formed at the inside of the base steel sheet, the more Al concentrated regions are formed at the inside of the base steel sheet.

Ca group elements have actions similar to Mg and form composite oxides of oxides of Ca group elements and oxides of Si. It is believed that if the composite oxides react with Al, Al is made to concentrate and the reaction regions. Further, if comparing the speeds of diffusion of the Mg and Ca group elements in the $SiO_2$, Ca group elements are faster. If Ca group elements are present in the annealing separator, composite oxides of $SiO_2$ and Ca group elements are formed in a region at the inside of the base metal sheet earlier than the $Mg_2SiO_4$ of the composite oxide of $SiO_2$ and Mg and the speed of anchoring oxides proceeding through the inside of the steel sheet is made to increase. By doing this, the annealing separator comprising the Ca group elements not only makes the anchoring oxide layer (2) increase in thickness, but also makes the positions of concentration of Al in it, that is, H5, increase. For this reason, the Ca group elements already become oxides or compounds comprising oxygen before preparing the aqueous slurry or after the drying process and have to diffuse in the annealing separator.

Further, if Ca group elements are comprised in the MgO raw material powder as impurities, the reactivity of the raw material powder MgO with the $SiO_2$ rises. Along with this, in the latter period of annealing as well, they function as relatively stable sources of Ca group elements. By supplying the sources of Ca group elements into the primary coating, the oxides of the primary coating can be stabilized. In this case, unstable $SiO_2$ can be replaced with $CaMgSi_2O_6$ or another stable oxide coating at any early period. On top of this, $CaMgSi_2O_6$ is stabilized as the source of Ca group elements not restricting the paths of supply of Mg. As a result, $CaMgSi_2O_6$ can be maintained in form until being replaced by $Mg_2SiO_4$. However, if the impurity Ca group elements in the MgO become excessively large, the amount of supply of Ca becomes excessive compared with the Mg, the supply of Mg group elements for forming the $CaMgSi_2O_6$ required for keeping the form of the primary coating complicated is decreased compared with the Ca group elements, and formation of more stable $MgSi_2O_4$ becomes delayed, whereby due to the heat impact of annealing, the primary coating changes in form and it becomes no longer possible to maintain the complicatedly intertwined form of the primary coating preventing point defects. As a result, point defects increase. Further, even if the impurity Ca group elements in the MgO are excessively small, in the same way, even if additives comprising Ca group elements added to other than the MgO raw material powder supply sufficient Ca group elements, the supply of Mg decrease relatively whereby the formation of more stable $MgSi_2O_4$ becomes slower and for a similar reason, point defects increase. As the total abundance ratio of the Ca group elements in the annealing separator balanced in the amounts of supply of Mg and Ca, there are CC=0.20 to 1.80 and CC'=0.010 to 0.080. CC'/CC=0.020 to 0.200.

If CC is less 0.20, the above effect cannot be sufficiently obtained. On the other hand, if CC is over 1.80, the anchoring oxide layer becomes excessively thick and the magnetic properties sometimes fall. If CC is 0.20 to 1.80, the drop in the magnetic properties can be suppressed while adhesion of a primary coating to a base steel sheet can be raised.

Further, if CC' is less than 0.010 or over 0.080 or if CC'/CC is less than 0.020 or over 0.200, point defects will occur. For this reason, the range of CC' of the present invention is 0.010 to 0.080 and the range of CC'/CC is 0.020 to 0.200.

Optional Constituents of Annealing Separator

The annealing separator may further comprise, in accordance with need, Ti, Zr, and Hf After this, the one or more elements selected from the group comprised of Ti, Zr, and Hf will sometimes be described as the "Ti group elements".

The ratios of contents of Ti, Zr, Hf, and Mg with respect to the content of MgO in the annealing separator are expressed by mass % and designated as [Ti], [Zr], [Hf], and [Mg]. The annealing separator contains these elements in exactly the amounts satisfying the following formula:

$$(0.0209[Ti]+0.0110[Zr]+0.0056[Hf])/0.0412[Mg]\times 100(\%) \leq 5.0(\%)$$

Here, the coefficients in the above formula are coefficients calculated thinking of the Ti, Zr, and Hf present in the annealing separator being respectively comprised as the stable oxides $TiO_2$, $ZrO_2$, $HfO_2$, and MgO and can be calculated as follows by coefficients calculated by the respective abundance ratios:

Coefficient of Ti: 1/atomic weight of Ti=1/47.9=0.0209
Coefficient of Zr: 1/atomic weight of Zr=1/91.2=0.0110
Coefficient of Hf: 1/atomic weight of Hf=1/178.5=0.0056
Coefficient of Mg: 1/atomic weight of Mg=1/24.3=0.0412
$(0.0209[Ti]+0.0110[Zr]+0.0056[Hf])/0.0412[Mg]\times 100$
(%) is the ratio (percentage) of the content obtained by converting the Ti group elements in the annealing separator to stable oxides of the elements and totaling them up and the main constituent substance MgO in the annealing separator. In other words, it can be said to be an indicator showing the magnitude of the effect of the Ti group elements on the Mg in the oxides. Below, $(0.0209[Ti]+0.0110[Zr]+0.0056[Hf])/0.0412[Mg]\times 100(\%)$ will be referred to as "CT". The Ti group elements may be included alone or as alloys or compounds. The compounds are for example sulfates, carbonates, hydroxides, etc.

In the finish annealing, the Ti group elements promote the reaction of the MgO in the annealing separator and the $SiO_2$ of the surface layer of the base steel sheet formed by the decarburization annealing and promote formation of $Mg_2SiO_4$. On the other hand, if CT is over 5.0, the effect becomes saturated, so 5.0 is made the upper limit.

Furthermore, the annealing separator can also comprise elements with known effects in ranges not obstructing the effect of the present invention.

The values of the above CY, CC, and CT are found from the contents of the group elements and content of Mg in the annealing separator.

Diffusion of Elements in Annealing Separator

The annealing separator of the present invention comprises the various above elements, but these are present not only as metals alone, but also in a state mixed as various types of compounds.

In the present invention, several provisions are made regarding this mixed state.

In the annealing separator of the present invention, the mean particle size of MgO is 0.1 to 2.8 μm. Below, the mean particle size of MgO will be referred to as R1.

If R1 is less than 0.1 m, the MgO becomes too active, the sheets of the coil stick together after the finish annealing, and the properties as an annealing separator deteriorate.

If R1 is over 2.8 m, MgO becomes too inert and the formation of the primary coating is delayed. For this reason, R1 is 0.1 to 2.8 m.

R1 and R2 are measured in the following way. That is, the raw material powder is measured by the laser diffraction/scattering method based on JIS Z8825 (2013) using a laser diffraction/scattering type particle size distribution measuring device to obtain the particle size distribution based on volume. Furthermore, this is converted to particle size distribution based on the number of particles and finally the mean particle size based on the number of particles is found for each element.

The annealing separator of the present invention has a mean particle size of the particles comprising the Ca group elements of 0.2 to 3.0 μm. Below, the mean particle size of the particles comprising the Ca group elements will be referred to as R2.

If R2 is less than 0.2 μm, the Ca becomes too active and the amount of supply of Ca group elements to the primary coating during formation becomes too large compared with the amount of supply of Mg. For this reason, the reaction of the Mg and the Si becomes slower, so formation of the $Mg_2SiO_4$ is conversely delayed and the adhesion of the primary coating deteriorates.

If R2 is over 3.0 μm, the MgO and $SiO_2$ no longer contact each other, so the formation of the $Mg_2 SiO_4$ is delayed and the adhesion of the primary coating deteriorates.

The method of measurement of R2 will be explained later.

What required note is that the R1 and R2 prescribed in the present invention are values calculated based on the numbers of particles.

In general, the mean particle size of particles are often prescribed based on weight. If based on weight, in powder with uneven particle sizes, the abundance ratio of particles in a specific range of particle size is expressed by a ratio in the total weight. This mean particle size based on weight cannot serve as representative particles of the measured object as a whole in the distribution of particle size. For example, if the abundance ratio of coarse particles which are extremely rare in frequency of presence changes slightly, since the ratio of coarse particles as weight in the whole is large, the mean particle size obtained greatly fluctuates.

On the other hand, the mean particle size based on the number of particles prescribed in the present invention is based on the number of particles present classified by size, so if the numbers of particles of specific sizes do not greatly change, the overall mean particle size will not greatly fluctuate. That is, the size becomes a value reflecting the particle size of particles with high frequency of presence. This value, in other words, has a strong correlation with the number of particles per unit volume.

The effect of the present invention is realized as explained later by control of the size of particles with a high frequency of existence. The provisions of the invention have to be based on the mean particle size based on the number of particles rather than based on weight.

Further, the annealing separator of the present invention has a ratio of R2 to R1, that is, R2/R1, within the range of 0.5 to 3.0.

If R2/R1 becomes less than 0.5, the area ratio (S1/S0) of the anchoring Al regions of the primary coating formed falls and the coating adhesion deteriorates. Preferably, it is 0.6 or more, more preferably 0.8 or more.

On the other hand, even if R2/R1 is over 3.0, the area ratio (S1/S0) of the anchoring oxides of the primary coating formed falls and the coating adhesion deteriorates. Preferably, it is 2.6 or less, more preferably 2.2 or less.

The reason why the coating adhesion is improved by the above R1, R2, and R2/R1 is not clear, but is believed to be as follows:

In general, the smaller the powder, the easier it becomes for it to aggregate. If mixing powder compounds with greatly different particle sizes, the fine compounds aggregate. If considering the mixed state of MgO and the Ca group elements, if the compounds of the Ca group elements are excessively fine and R2/R1 becomes less than 0.5, the compounds of the Ca group elements aggregate. If making such a mixture deposit on the surface of the base steel sheet, in the state of contact with the base steel sheet, regions in which only the Ca group elements contact the base steel sheet will be present as regions of considerable size. In formation of the primary coating proceeds due to the finish annealing in this state, in regions where only the Ca group elements contacts the base steel sheet, the supply of Mg becomes slow, so the formation of the primary coating becomes slow and the coating adhesion becomes poor.

In the same way, if R2/R1 is over 3.0, the diffusion of the Ca group elements with respect to the MgO becomes sparser, so the supply of Ca is delayed and the coating adhesion of the primary coating formed becomes poor.

This results in the presence of compounds of Ca group elements between the MgO and the steel sheet and obstructs the supply of Mg to the base steel sheet. That is, regions where the MgO does not contact the base steel sheet are just voids if compounds of Ca group elements are not present in relatively fine states, but if compounds of Ca group elements are relatively fine, the regions change to regions obstructing the supply of Mg to the base steel sheet. As a result, in regions where the MgO contacts the base steel sheet and regions where it does not, a remarkable difference arises in the supply of Mg to the base steel sheet and the primary coating becomes uneven in development. For this reason, the number density of the anchoring oxides becomes excessive and becomes an inhibiting factor in the magnetic properties.

In the same way, even if adding Ca group elements with a particle size excessively larger than the particle size of the MgO, the range by which the Ca group elements can be supplied is decreased, so in the end, the supply of Ca group elements becomes lopsided and, at locations where they are excessively supplied, the number density of the roots of the primary coating becomes excessively high.

On the other hand, if R2/R1 is in a suitable range, the number density of compounds of Ca group elements dispersed in the annealing separator layer near the steel sheet increases, so compared with making the compounds of the Ca group elements finer and adding them in large amounts, the supply of Ca, Sr, and Ba to the base steel sheet becomes uniform and as a result the number density of the anchoring oxides can be made uniform.

Annealing Separator Layer

The present invention prescribes the structure of the annealing separator in the state deposited on the surface of the steel sheet right before the finish annealing after the end of the above-mentioned process for forming an annealing separator layer.

In the annealing separator layer of the present invention, the number density of particles comprising Ca group elements in the Ca group concentrated regions present in the region of 0 to 3.0 μm from the surface of the base steel sheet is 0.003 to 1.400/μm². Below, this "number density of particles comprising Ca group elements in the Ca group concentrated regions" will be referred to as D42. If controlling D42 to the above range, the adhesion of the primary coating after the finish annealing is improved.

The reason why the adhesion of the primary coating is improved if D42 is in the above range is not completely clear, but is believed to be as follows: It is believed, as explained above, that the Ca group elements comprised in the annealing separator diffuse in the primary coating formed during the finish annealing toward the base steel sheet side and form composite oxides with the Al supplied from the base steel sheet side of the primary coating, that is, from the base metal side at the front ends of the anchoring oxides thereby acting to fix the Al at the front ends of the anchoring oxides. To render this action more remarkable, the position of presence of the Ca group elements in the annealing separator layer is important. The presence of Ca group element concentrated regions at the base steel sheet side, that is, the region of 0 to 3.0 μm from the surface of the base steel sheet, becomes convenient. Further, as explained above, contact with the base steel sheet should not have a local leaning. A suitable state of diffusion of elements in the annealing separator is believed to be correlated with the number density of Ca group concentrated regions of the primary coating formed.

D42 can be found by the following method.

The annealing separator layer of the surface of the finish annealing-use steel sheet after drying is analyzed by an EDS-SEM at the cross-section obtained by working each finish annealing-use steel sheet by CP processing to obtain a characteristic X-ray intensity of the Ca group elements. That is, the obtained characteristic X-ray intensity distribution chart is a distribution chart laying out information held by the annealing separator projected on a plane parallel to the cross-section of the finish annealing-use steel sheet in the thickness direction. The characteristic X-ray intensity distribution chart of the Ca group elements is obtained by a field of view where the border between the surface of the steel sheet and the annealing separator layer becomes extremely parallel to the upper and lower ends of the observed region and, furthermore, the annealing separator layer does not stick out to the outside from the under and lower ends the observed region. Below, the observed width direction of surface of the steel sheet and the annealing separator layer and the direction perpendicular to the observed width direction will be called the observed height direction. The scanning steps of the characteristic X-ray intensity distribution chart are made the same in the observed width direction and observed height direction and is made a length of 0.1 or less. Further, the observed width direction is made at least a length of 20 μm or more. That is, the characteristic X-ray intensity distribution chart is broken down in at least 200 pixels in the observed width direction. Here, in the characteristic X-ray intensity distributions of the obtained Ca group elements, the respective of the characteristic X-ray intensities of Ca, Sr, and Ba are identified and a region where a characteristic X-ray intensity of Ca of 20% or more of the maximum value of the characteristic X-ray intensity of Ca is obtained, a region where a characteristic X-ray intensity of Sr of 20% or more of the maximum value of the characteristic X-ray intensity of Sr is obtained, and a region where a characteristic X-ray intensity of Ba of 20% or more of the maximum value of the characteristic X-ray intensity of Ba is obtained are together defined as "Ca group element concentrated regions". Furthermore, a region where pixels of such a Ca group element concentrated region continue up and down or left and right in pixel units is deemed as a single region and a region comprised of four or more pixels is judged to be a particle. Furthermore, the coordinates of the center of gravity of each Ca group element concentrated region of the observed region is obtained by image analysis. After that, a number N1 of particles with centers of gravity present at a height of 3 μm from the surface of the base steel sheet in the thickness direction is counted. The mean value R2 of the circle equivalent diameters of the particles comprising Ca group elements in the Ca group element concentrated regions ($\sqrt{((area\ of\ 1\ pixel) \times (number\ of\ pixels\ of\ consecutive\ units) \times 4/\pi)}$) is calculated. From the obtained N1, the R2 obtained as explained above, and the length L m of the observed region in the direction of observation (length of observed region in direction perpendicular to thickness direction at cross-section (length of observed region in width direction of finish annealing-use steel sheet)), $D42=N1/(3 \times L \times R2)(/\mu m^3)$ can be obtained.

Note that, the mean particle size (for example, R1) of compounds dispersed in the annealing separator layer is understood as being substantially the same as the mean particle size obtained from the distribution of particle size of the raw material powder alone added when prepared as an aqueous slurry. Accordingly, the mean particle sizes of the compounds can be found from the mean particle sizes of the raw material powders using methods similar to the method of calculation of R1. The method for controlling the sizes of particles of compounds comprising the elements in the raw material powder to suitable ranges does not have to be limited. Powder having the targeted distribution of particle size can be manufactured by the adjustment of the firing conditions and classification etc. It would not be difficult for a person skilled in the art manufacturing the raw material powder.

By using such Ca group compound powder and MgO powder as raw material for the aqueous slurry, it is possible to suitably control the number density of Ca group concentrated regions by regions of 0 to 3.0 μm from the surface of the base steel sheet in the annealing separator layer.

EXAMPLES

Below, modes of the present invention will be explained more specifically by examples. These examples are just illustrations for confirming the effects of the present invention and do not limit the present invention.

The present invention relates to an annealing separator having an important role in formation of the primary coating and covering the steel sheet before finish annealing and to a primary coating formed by the same. The base steel sheet does not have to be a special one. For this reason, in the examples, the steel sheet was manufactured under constant conditions (hot rolling, cold rolling, and annealing conditions etc.) not having a direct relationship with the effects of the invention. First, the common conditions in the examples as a whole will be explained, then the results of study of the effects of the invention by changing the conditions relating to the primary coating in Examples 1 and 2 will be explained.

Manufacture of Grain-Oriented Electrical Steel Sheet

Molten steel having each of the chemical compositions shown in Table 1 was produced by a vacuum melting furnace. The molten steel produced was used to manufacture a slab by continuous casting.

TABLE 1

| Molten steel no. | C | Si | Mn | S | Se | S + Se | sol. Al | N | Cu | Sn | Sb | Cu + Sn + Sb | Bi | Te | Pb | Bi + Te + Pb |
|---|---|---|---|---|---|---|---|---|---|---|---|---|---|---|---|---|
| 1 | 0.077 | 3.3 | 0.074 | 0.028 | — | 0.028 | 0.030 | 0.0080 | — | — | — | 0.00 | — | — | — | 0.000 |
| 2 | 0.078 | 3.3 | 0.075 | — | 0.044 | 0.044 | 0.029 | 0.0080 | — | — | — | 0.00 | — | — | — | 0.000 |
| 3 | 0.108 | 3.3 | 0.074 | 0.025 | — | 0.025 | 0.030 | 0.0077 | — | — | — | 0.00 | — | — | — | 0.000 |
| 4 | 0.078 | 2.2 | 0.074 | 0.028 | — | 0.028 | 0.030 | 0.0080 | — | — | — | 0.00 | — | — | — | 0.000 |
| 5 | 0.077 | 4.8 | 0.074 | 0.025 | — | 0.025 | 0.030 | 0.0078 | — | — | — | 0.00 | — | — | — | 0.000 |
| 6 | 0.078 | 3.3 | 0.018 | — | 0.032 | 0.032 | 0.029 | 0.0080 | — | — | — | 0.00 | — | — | — | 0.000 |
| 7 | 0.078 | 3.3 | 0.240 | 0.027 | — | 0.027 | 0.030 | 0.0080 | — | — | — | 0.00 | — | — | — | 0.000 |
| 8 | 0.078 | 3.3 | 0.076 | 0.002 | — | 0.002 | 0.030 | 0.0080 | — | — | — | 0.00 | — | — | — | 0.000 |
| 9 | 0.078 | 3.3 | 0.075 | 0.002 | 0.002 | 0.004 | 0.030 | 0.0080 | — | — | — | 0.00 | — | — | — | 0.000 |
| 10 | 0.077 | 3.3 | 0.074 | — | 0.003 | 0.003 | 0.030 | 0.0080 | — | — | — | 0.00 | — | — | — | 0.000 |
| 11 | 0.077 | 3.3 | 0.076 | — | 0.065 | 0.065 | 0.030 | 0.0080 | — | — | — | 0.00 | — | — | — | 0.000 |
| 12 | 0.078 | 3.3 | 0.077 | 0.035 | 0.030 | 0.065 | 0.030 | 0.0080 | — | — | — | 0.00 | — | — | — | 0.000 |
| 13 | 0.077 | 3.3 | 0.076 | 0.062 | — | 0.062 | 0.029 | 0.0080 | — | — | — | 0.00 | — | — | — | 0.000 |
| 14 | 0.078 | 3.3 | 0.075 | 0.028 | 0.010 | 0.038 | 0.004 | 0.0080 | — | — | — | 0.00 | — | — | — | 0.000 |
| 15 | 0.078 | 3.3 | 0.074 | 0.020 | 0.015 | 0.035 | 0.060 | 0.0080 | — | — | — | 0.00 | — | — | — | 0.000 |
| 16 | 0.078 | 3.3 | 0.077 | 0.020 | 0.013 | 0.033 | 0.029 | 0.0020 | — | — | — | 0.00 | — | — | — | 0.000 |
| 17 | 0.076 | 3.3 | 0.074 | 0.015 | 0.020 | 0.035 | 0.029 | 0.0030 | — | — | — | 0.00 | — | — | — | 0.000 |
| 18 | 0.078 | 3.3 | 0.074 | 0.021 | 0.011 | 0.032 | 0.030 | 0.0080 | 0.10 | — | — | 0.10 | — | — | — | 0.000 |
| 19 | 0.078 | 3.3 | 0.074 | 0.019 | 0.015 | 0.034 | 0.030 | 0.0080 | 0.62 | — | — | 0.62 | — | — | — | 0.000 |
| 20 | 0.078 | 3.3 | 0.075 | 0.027 | — | 0.027 | 0.031 | 0.0079 | 0.10 | 0.07 | — | 0.17 | — | — | — | 0.000 |
| 21 | 0.078 | 3.3 | 0.077 | 0.028 | — | 0.028 | 0.030 | 0.0080 | 0.10 | — | 0.07 | 0.17 | — | — | — | 0.000 |
| 22 | 0.078 | 3.3 | 0.075 | 0.024 | 0.008 | 0.032 | 0.030 | 0.0080 | 0.10 | 0.20 | 0.02 | 0.32 | — | — | — | 0.000 |
| 23 | 0.076 | 3.3 | 0.075 | 0.025 | — | 0.025 | 0.030 | 0.0080 | 0.16 | 0.46 | — | 0.62 | — | — | — | 0.000 |
| 24 | 0.078 | 3.3 | 0.075 | 0.026 | 0.010 | 0.036 | 0.030 | 0.0080 | 0.10 | 0.08 | — | 0.18 | 0.003 | — | — | 0.003 |
| 25 | 0.078 | 3.3 | 0.080 | 0.025 | — | 0.025 | 0.030 | 0.0080 | 0.10 | 0.08 | — | 0.18 | 0.006 | 0.005 | — | 0.011 |
| 26 | 0.077 | 3.3 | 0.075 | 0.028 | 0.015 | 0.025 | 0.030 | 0.0080 | — | 0.08 | 0.05 | 0.13 | — | — | 0.003 | 0.003 |
| 27 | 0.078 | 3.3 | 0.075 | 0.028 | 0.01 | 0.038 | 0.030 | 0.0080 | 0.10 | 0.08 | — | 0.18 | 0.010 | 0.016 | 0.005 | 0.031 |

Each slab of Table 1 heated at 1350° C. was rolled hot to manufacture hot rolled steel sheet having a thickness of 2.3 mm. In Molten Steel No. 5, the content of Si in the molten steel was too great, so cracks occurred at the time of hot rolling and hot rolled steel sheet could not be manufactured.

The obtained hot rolled steel sheet was annealed, then the hot rolled steel sheet was pickled. The hot rolling annealing was performed at 1100° C. for 5 minutes.

The hot rolled steel sheet after the pickling was cold rolled to manufacture cold rolled steel sheet having a thickness of 0.22 mm. The cold rolling rate was 90.4%.

The cold rolled steel sheet was annealed by primary recrystallization annealing doubling as decarburization annealing. The annealing temperature of the primary recrystallization annealing was 750 to 950° C. The holding time at the annealing temperature was 2 minutes.

The cold rolled steel sheet after primary recrystallization annealing was coated on its front and back surfaces with an aqueous slurry prepared by mixing the annealing separator of the constituents of Table 2 with pure water.

TABLE 2

| | | Additives in annealing separator | | | | | | | | |
|---|---|---|---|---|---|---|---|---|---|---|
| Test no. | Steel sheet no. | $CaSO_4$ content (mass %) | $SrCO_3$ content (mass %) | $BaSO_4$ content (mass %) | [Mg] in MgO [Mg'] (mass %) | [Ca] in MgO [Ca'] (mass %) | [Sr] in MgO [Sr'] (mass %) | [Ba] in MgO [Ba'] (mass %) | CC (abundance ratio) | $Y_2O_3$ content (mass %) |
| 1 | 1 | 0.40 | 0.00 | 0.00 | 60.16 | 0.02 | 0.00 | 0.00 | 0.14 | 0.00 |
| 2 | 2 | 0.00 | 0.45 | 0.00 | 60.16 | 0.00 | 0.02 | 0.01 | 0.14 | 0.00 |
| 3 | 1 | 0.00 | 0.00 | 0.50 | 60.15 | 0.01 | 0.00 | 0.02 | 0.10 | 4.20 |
| 4 | 2 | 6.00 | 0.00 | 0.00 | 60.11 | 0.06 | 0.02 | 0.00 | 1.85 | 2.80 |
| 5 | 1 | 0.00 | 7.00 | 1.50 | 60.13 | 0.05 | 0.01 | 0.00 | 2.23 | 1.50 |
| 6 | 2 | 4.00 | 1.50 | 3.00 | 60.13 | 0.04 | 0.02 | 0.00 | 2.17 | 0.00 |
| 7 | 1 | 1.20 | 0.00 | 0.00 | 60.16 | 0.00 | 0.02 | 0.00 | 0.37 | 1.20 |
| 8 | 2 | 0.00 | 0.50 | 0.80 | 60.16 | 0.00 | 0.00 | 0.02 | 0.28 | 1.80 |
| 9 | 1 | 0.00 | 0.00 | 1.40 | 60.17 | 0.00 | 0.00 | 0.02 | 0.25 | 2.50 |
| 10 | 2 | 0.00 | 3.00 | 0.00 | 60.07 | 0.05 | 0.02 | 0.07 | 0.90 | 0.00 |
| 11 | 1 | 1.50 | 0.00 | 1.40 | 60.10 | 0.09 | 0.00 | 0.00 | 0.78 | 1.20 |
| 12 | 2 | 0.00 | 2.00 | 2.00 | 59.98 | 0.02 | 0.08 | 0.18 | 1.01 | 0.00 |
| 13 | 1 | 3.20 | 0.00 | 0.00 | 60.16 | 0.00 | 0.03 | 0.00 | 0.96 | 0.00 |
| 14 | 2 | 0.00 | 3.50 | 0.30 | 60.16 | 0.00 | 0.02 | 0.01 | 1.02 | 0.00 |
| 15 | 1 | 1.00 | 0.00 | 2.00 | 60.16 | 0.01 | 0.00 | 0.01 | 0.65 | 5.50 |
| 16 | 2 | 0.00 | 0.00 | 0.80 | 60.09 | 0.04 | 0.07 | 0.00 | 0.21 | 0.00 |
| 17 | 1 | 0.40 | 0.00 | 0.30 | 60.10 | 0.00 | 0.08 | 0.03 | 0.22 | 1.25 |
| 18 | 2 | 0.00 | 1.00 | 0.00 | 60.10 | 0.06 | 0.00 | 0.04 | 0.35 | 1.20 |
| 19 | 18 | 1.50 | 0.00 | 0.00 | 60.15 | 0.02 | 0.01 | 0.01 | 0.47 | 0.00 |
| 20 | 18 | 3.00 | 0.00 | 0.00 | 60.15 | 0.02 | 0.01 | 0.01 | 0.92 | 1.00 |
| 21 | 18 | 0.00 | 1.70 | 0.00 | 60.15 | 0.02 | 0.01 | 0.01 | 0.49 | 0.00 |
| 22 | 18 | 0.00 | 3.40 | 0.00 | 60.15 | 0.02 | 0.01 | 0.01 | 0.96 | 1.80 |
| 23 | 18 | 0.00 | 0.00 | 1.80 | 60.15 | 0.02 | 0.01 | 0.01 | 0.34 | 1.20 |
| 24 | 18 | 0.00 | 0.00 | 3.60 | 60.15 | 0.02 | 0.01 | 0.01 | 0.65 | 7.50 |

TABLE 2-continued

| | | | | | | | | | | | |
|---|---|---|---|---|---|---|---|---|---|---|---|
| 25 | 19 | 1.50 | 0.00 | 0.00 | 60.15 | 0.02 | 0.01 | 0.01 | 0.47 | 2.00 | |
| 26 | 19 | 1.50 | 0.00 | 0.00 | 60.15 | 0.02 | 0.01 | 0.01 | 0.47 | 1.00 | |
| 27 | 20 | 1.50 | 0.00 | 0.00 | 60.15 | 0.02 | 0.01 | 0.01 | 0.47 | 2.00 | |
| 28 | 21 | 1.50 | 0.00 | 0.00 | 60.15 | 0.02 | 0.01 | 0.01 | 0.47 | 1.00 | |
| 29 | 22 | 0.00 | 2.10 | 0.00 | 60.15 | 0.02 | 0.01 | 0.01 | 0.60 | 0.00 | |
| 30 | 24 | 0.00 | 2.50 | 0.00 | 60.15 | 0.03 | 0.01 | 0.00 | 0.72 | 3.00 | |
| 31 | 24 | 0.00 | 0.00 | 3.10 | 60.15 | 0.03 | 0.01 | 0.00 | 0.57 | 0.00 | |
| 32 | 22 | 0.00 | 0.00 | 3.20 | 60.15 | 0.03 | 0.01 | 0.00 | 0.59 | 1.00 | |
| 33 | 24 | 0.00 | 0.00 | 4.20 | 60.15 | 0.03 | 0.01 | 0.00 | 0.76 | 2.40 | |
| 34 | 24 | 1.20 | 2.50 | 0.00 | 60.15 | 0.03 | 0.01 | 0.00 | 1.08 | 0.00 | |
| 35 | 1 | 1.50 | 1.20 | 0.00 | 60.15 | 0.03 | 0.01 | 0.00 | 0.81 | 1.00 | |
| 36 | 1 | 2.20 | 0.80 | 0.00 | 60.15 | 0.03 | 0.01 | 0.00 | 0.91 | 0.00 | |
| 37 | 1 | 1.20 | 0.00 | 3.20 | 60.15 | 0.03 | 0.01 | 0.00 | 0.95 | 2.20 | |
| 38 | 1 | 1.80 | 0.00 | 2.50 | 60.15 | 0.03 | 0.01 | 0.00 | 1.00 | 0.00 | |
| 39 | 2 | 2.20 | 0.00 | 1.60 | 60.15 | 0.03 | 0.01 | 0.00 | 0.97 | 5.00 | |
| 40 | 2 | 1.00 | 1.20 | 1.40 | 60.15 | 0.03 | 0.01 | 0.00 | 0.90 | 0.00 | |
| 41 | 2 | 2.00 | 2.40 | 2.80 | 60.15 | 0.03 | 0.01 | 0.00 | 1.77 | 1.50 | |
| 42 | 2 | 0.00 | 6.00 | 0.00 | 60.15 | 0.03 | 0.01 | 0.00 | 1.68 | 1.60 | |
| 43 | 18 | 4.80 | 0.00 | 0.00 | 60.15 | 0.03 | 0.01 | 0.00 | 1.46 | 0.00 | |
| 44 | 18 | 0.00 | 0.00 | 9.00 | 60.15 | 0.03 | 0.01 | 0.00 | 1.59 | 0.00 | |
| 45 | 18 | 3.20 | 0.00 | 0.00 | 60.15 | 0.03 | 0.01 | 0.00 | 0.99 | 0.00 | |
| 46 | 20 | 3.10 | 0.00 | 0.00 | 60.15 | 0.03 | 0.01 | 0.00 | 0.96 | 1.90 | |
| 47 | 21 | 0.00 | 3.80 | 0.00 | 60.15 | 0.03 | 0.01 | 0.00 | 1.08 | 2.00 | |
| 48 | 22 | 0.00 | 3.30 | 0.00 | 60.15 | 0.03 | 0.01 | 0.00 | 0.94 | 1.50 | |
| 49 | 24 | 0.00 | 0.00 | 4.20 | 60.15 | 0.03 | 0.01 | 0.00 | 0.76 | 1.60 | |
| 50 | 25 | 0.00 | 0.00 | 4.40 | 60.15 | 0.03 | 0.01 | 0.00 | 0.80 | 1.80 | |
| 51 | 26 | 3.20 | 0.25 | 0.00 | 60.15 | 0.03 | 0.01 | 0.00 | 1.05 | 2.10 | |
| 52 | <u>27</u> | 3.50 | 1.50 | 0.00 | 60.15 | 0.03 | 0.01 | 0.00 | 1.48 | 3.50 | |

| | | Additives in annealing separator | | | | | | | | | |
|---|---|---|---|---|---|---|---|---|---|---|---|
| Test no. | $La_2O_3$ content (mass %) | $CeO_2$ content (mass %) | CY (abundance ratio) | RCa (μm) | RSr (μm) | RBa (μm) | R1 (μm) | R2 (μm) | R2/R1 | Remarks | |
| 1 | 0.00 | 3.00 | 0.70 | 2.10 | — | — | 0.80 | 2.10 | 2.63 | Comp. ex. | |
| 2 | 3.40 | 0.00 | 0.42 | — | 2.08 | — | 0.80 | 2.08 | 2.60 | Comp. ex. | |
| 3 | 0.00 | 0.00 | 0.75 | — | — | 1.55 | 0.80 | 1.55 | 1.94 | Comp. ex. | |
| 4 | 0.00 | 0.00 | 0.50 | 2.10 | — | — | 0.80 | 2.10 | 2.63 | Comp. ex. | |
| 5 | 1.50 | 0.00 | 0.45 | — | 2.08 | 1.55 | 0.80 | 1.96 | 2.45 | Comp. ex. | |
| 6 | 1.50 | 1.50 | 0.54 | 0.22 | 0.50 | 0.50 | 0.60 | 0.31 | 0.52 | Comp. ex. | |
| 7 | 0.00 | 3.00 | 0.92 | 1.50 | — | — | 0.60 | 1.50 | 2.50 | Comp. ex. | |
| 8 | 1.00 | 0.50 | 0.56 | — | 0.20 | 0.50 | 0.60 | 0.32 | 0.53 | Comp. ex. | |
| 9 | 0.00 | 0.00 | 0.45 | — | — | 1.55 | 0.60 | 1.55 | 2.58 | Comp. ex. | |
| 10 | 0.00 | 3.00 | 0.71 | — | 2.08 | — | 0.80 | 2.08 | 2.60 | Comp. ex. | |
| 11 | 0.00 | 3.00 | 0.92 | 1.50 | — | 1.09 | 0.80 | 1.27 | 1.59 | Comp. ex. | |
| 12 | 2.00 | 1.20 | 0.53 | — | 1.42 | 1.09 | 0.80 | 1.23 | 1.54 | Comp. ex. | |
| 13 | 0.00 | 3.00 | 0.70 | 2.10 | — | — | 0.80 | 2.10 | 2.63 | Comp. ex. | |
| 14 | 4.50 | 0.00 | 0.56 | — | 1.42 | 0.50 | 0.60 | 1.24 | 2.07 | Comp. ex. | |
| 15 | 0.00 | 0.00 | 0.98 | 2.10 | — | 1.09 | 0.60 | 1.30 | 2.16 | Comp. ex. | |
| 16 | 0.00 | 6.00 | 1.41 | — | — | 1.55 | 0.60 | 1.55 | 2.58 | Comp. ex. | |
| 17 | 2.50 | 0.00 | 0.53 | 1.50 | — | 1.55 | 0.60 | 1.52 | 2.54 | Comp. ex. | |
| 18 | 0.00 | 3.20 | 0.97 | — | 2.08 | — | 0.80 | 2.08 | 2.60 | Comp. ex. | |
| 19 | 1.40 | 0.00 | 0.17 | 0.22 | — | — | 0.40 | 0.22 | 0.55 | Comp. ex. | |
| 20 | 0.00 | 0.00 | 0.18 | 1.50 | — | — | 0.80 | 1.50 | 1.88 | Comp. ex. | |
| 21 | 0.00 | 0.70 | 0.16 | — | 1.42 | — | 0.80 | 1.42 | 1.78 | Comp. ex. | |
| 22 | 5.00 | 3.20 | 1.69 | — | 1.42 | — | 0.80 | 1.42 | 1.78 | Comp. ex. | |
| 23 | 0.50 | 5.80 | 1.64 | — | — | 1.55 | 0.80 | 1.55 | 1.94 | Comp. ex. | |
| 24 | 2.80 | 0.00 | 1.69 | — | — | 1.55 | 0.80 | 1.55 | 1.94 | Comp. ex. | |
| 25 | 0.00 | 1.50 | 0.71 | 1.80 | — | — | 3.20 | 1.80 | 0.56 | Comp. ex. | |
| 26 | 1.30 | 0.00 | 0.34 | 0.22 | — | — | 0.09 | 0.22 | 2.44 | Comp. ex. | |
| 27 | 0.00 | 1.50 | 0.71 | 0.19 | — | — | 0.22 | 0.19 | 0.86 | Comp. ex. | |
| 28 | 1.30 | 0.00 | 0.34 | 3.20 | — | — | 1.20 | 3.20 | 2.67 | Comp. ex. | |
| 29 | 0.00 | 1.50 | 0.35 | — | 0.18 | — | 0.18 | 0.18 | 1.00 | Comp. ex. | |
| 30 | 0.00 | 0.80 | 0.72 | — | 3.50 | — | 1.20 | 3.50 | 2.92 | Comp. ex. | |
| 31 | 0.00 | 2.40 | 0.56 | — | — | 0.15 | 0.20 | 0.15 | 0.75 | Comp. ex. | |
| 32 | 0.00 | 1.60 | 0.55 | — | — | 3.80 | 1.50 | 3.80 | 2.53 | Comp. ex. | |
| 33 | 0.00 | 0.00 | 0.43 | — | — | 1.55 | 0.40 | 1.55 | 3.88 | Comp. ex. | |
| 34 | 2.40 | 0.00 | 0.30 | 0.20 | 0.25 | — | 0.80 | 0.23 | 0.29 | Comp. ex. | |
| 35 | 3.20 | 0.00 | 0.58 | 1.50 | 1.42 | — | 0.80 | 1.46 | 1.83 | Inv. ex. | |
| 36 | 4.20 | 0.00 | 0.52 | 1.50 | 1.42 | — | 0.80 | 1.48 | 1.85 | Inv. ex. | |
| 37 | 0.00 | 1.20 | 0.68 | 1.50 | — | 1.55 | 0.80 | 1.54 | 1.92 | Inv. ex. | |
| 38 | 4.60 | 0.00 | 0.57 | 1.50 | — | 1.55 | 0.80 | 1.53 | 1.91 | Inv. ex. | |
| 39 | 0.00 | 0.00 | 0.89 | 1.50 | — | 1.55 | 0.80 | 1.52 | 1.90 | Inv. ex. | |
| 40 | 0.00 | 3.20 | 0.75 | 1.50 | 1.42 | 1.55 | 0.80 | 1.49 | 1.86 | Inv. ex. | |
| 41 | 1.00 | 1.20 | 0.67 | 1.50 | 1.42 | 1.55 | 0.80 | 1.49 | 1.86 | Inv. ex. | |
| 42 | 0.00 | 2.20 | 0.80 | — | 1.42 | — | 0.80 | 1.42 | 1.78 | Inv. ex. | |
| 43 | 3.20 | 1.60 | 0.77 | 1.50 | — | — | 0.80 | 1.50 | 1.88 | Inv. ex. | |
| 44 | 2.40 | 2.00 | 0.77 | — | — | 1.55 | 0.80 | 1.55 | 1.94 | Inv. ex. | |
| 45 | 1.50 | 2.80 | 0.84 | 1.50 | — | — | 0.80 | 1.50 | 1.88 | Inv. ex. | |

TABLE 2-continued

| | | | | | | | | | | |
|---|---|---|---|---|---|---|---|---|---|---|
| 46 | 0.00 | 0.00 | 0.34 | 1.50 | — | — | 0.80 | 1.50 | 1.88 | Inv. ex. |
| 47 | 0.00 | 1.50 | 0.71 | — | 1.42 | — | 0.80 | 1.42 | 1.78 | Inv. ex. |
| 48 | 0.00 | 2.10 | 0.76 | — | 1.42 | — | 0.80 | 1.42 | 1.78 | Inv. ex. |
| 49 | 0.00 | 2.80 | 0.94 | — | — | 1.55 | 0.80 | 1.55 | 1.94 | Inv. ex. |
| 50 | 1.50 | 1.50 | 0.86 | — | — | 1.55 | 0.80 | 1.55 | 1.94 | Inv. ex. |
| 51 | 1.20 | 0.80 | 0.71 | 1.50 | 1.42 | — | 0.80 | 1.49 | 1.87 | Inv. ex. |
| 52 | 2.00 | 0.90 | 1.09 | 1.50 | 1.42 | — | 0.80 | 1.48 | 1.84 | Comp. ex. |

The decarburization annealed steel sheet coated with an aqueous slurry on its surface was held in a 900° C. furnace for 10 seconds to dry the aqueous slurry.

A sample was taken from the finish annealing-use steel sheet obtained by this process and was measured for number density D42 of particles comprising the one or more elements selected from a group comprising Ca, Sr, and Ba in the Ca group element concentrated regions present in a region of 0 to 3.0 μm from the surface of the base steel sheet. The value is shown in Table 2.

Furthermore, the sample was finish annealed holding it at 1200° C. for 20 hours. Due to the above manufacturing process, grain-oriented electrical steel sheet having a base steel sheet and a primary coating was manufactured.

In Molten Steel No. 3, the content of C was too great, the value of the iron loss after secondary recrystallization greatly deteriorated, and the result became outside the scope of the present invention. In Molten Steel No. 4, the content of Si was too small and secondary recrystallization did not occur, so the value of the magnetic flux density B8 greatly deteriorated and the result became outside the scope of the present invention.

In Molten Steel Nos. 6 to 17, the content of Mn, S, Se, sol. Al, or N was outside the range of the suitable amount for forming the precipitate required for causing secondary recrystallization and secondary recrystallization did not occur, so the value of the magnetic flux density B8 greatly deteriorated and the result became outside the scope of the present invention.

In Molten Steel No. 19, the content of Cu was too great, the coating adhesion became extremely poor, and the result became outside the scope of the present invention.

In Molten Steel No. 23, the content of Sn was too great, the coating adhesion became poor, and the result became outside the scope of the present invention.

In Molten Steel No. 27, the total content of Bi, Te, and Pb was too great, the coating adhesion became poor, and the result became outside the scope of the present invention.

In the above manufacturing, in the same way as general grain-oriented electrical steel sheet, decarburization annealing and finish annealing (purification annealing) were performed. Due to this, the composition of the base steel sheet become different from the raw material slab. The chemical composition of the base steel sheet of the grain-oriented electrical steel sheet manufactured is shown in Table 3.

TABLE 3

| Steel sheet no. | C | Si | Mn | S | Se | S + Se | sol. Al | N | Cu | Sn | Sb | Bi | Te | Pb |
|---|---|---|---|---|---|---|---|---|---|---|---|---|---|---|
| 1 | 0.0005 | 3.3 | 0.073 | 0.001 | <0.0005 | 0.001 | 0.001 | 0.003 | <0.0005 | <0.0005 | <0.0005 | <0.0005 | <0.0005 | <0.0005 |
| 2 | 0.0005 | 3.3 | 0.075 | <0.0005 | 0.001 | 0.001 | 0.001 | 0.003 | <0.0005 | <0.0005 | <0.0005 | <0.0005 | <0.0005 | <0.0005 |
| 3 | 0.0180 | 3.3 | 0.073 | 0.001 | <0.0005 | 0.001 | 0.001 | 0.002 | <0.0005 | <0.0005 | <0.0005 | <0.0005 | <0.0005 | <0.0005 |
| 4 | 0.0005 | 2.0 | 0.074 | 0.001 | <0.0005 | 0.001 | 0.001 | 0.002 | <0.0005 | <0.0005 | <0.0005 | <0.0005 | <0.0005 | <0.0005 |
| 6 | 0.0005 | 3.3 | 0.017 | <0.0005 | 0.001 | 0.001 | 0.001 | 0.003 | <0.0005 | <0.0005 | <0.0005 | <0.0005 | <0.0005 | <0.0005 |
| 7 | 0.0005 | 3.3 | 0.234 | 0.001 | <0.0005 | 0.001 | 0.001 | 0.002 | <0.0005 | <0.0005 | <0.0005 | <0.0005 | <0.0005 | <0.0005 |
| 8 | 0.0005 | 3.3 | 0.076 | 0.001 | <0.0005 | 0.001 | 0.002 | 0.003 | <0.0005 | <0.0005 | <0.0005 | <0.0005 | <0.0005 | <0.0005 |
| 9 | 0.0005 | 3.3 | 0.075 | 0.001 | 0.001 | 0.002 | 0.002 | 0.003 | <0.0005 | <0.0005 | <0.0005 | <0.0005 | <0.0005 | <0.0005 |
| 10 | 0.0005 | 3.3 | 0.072 | <0.0005 | 0.001 | 0.001 | 0.001 | 0.003 | <0.0005 | <0.0005 | <0.0005 | <0.0005 | <0.0005 | <0.0005 |
| 11 | 0.0005 | 3.3 | 0.076 | <0.0005 | 0.003 | 0.003 | 0.001 | 0.003 | <0.0005 | <0.0005 | <0.0005 | <0.0005 | <0.0005 | <0.0005 |
| 12 | 0.0005 | 3.3 | 0.077 | 0.001 | 0.001 | 0.002 | 0.001 | 0.003 | <0.0005 | <0.0005 | <0.0005 | <0.0005 | <0.0005 | <0.0005 |
| 13 | 0.0005 | 3.3 | 0.074 | 0.003 | <0.0005 | 0.003 | 0.001 | 0.003 | <0.0005 | <0.0005 | <0.0005 | <0.0005 | <0.0005 | <0.0005 |
| 14 | 0.0005 | 3.3 | 0.075 | 0.001 | 0.001 | 0.002 | 0.001 | 0.001 | <0.0005 | <0.0005 | <0.0005 | <0.0005 | <0.0005 | <0.0005 |
| 15 | 0.0005 | 3.3 | 0.074 | 0.001 | 0.001 | 0.002 | 0.002 | 0.003 | <0.0005 | <0.0005 | <0.0005 | <0.0005 | <0.0005 | <0.0005 |
| 16 | 0.0005 | 3.3 | 0.076 | 0.001 | 0.001 | 0.002 | 0.001 | 0.002 | <0.0005 | <0.0005 | <0.0005 | <0.0005 | <0.0005 | <0.0005 |
| 17 | 0.0005 | 3.3 | 0.074 | 0.001 | 0.001 | 0.002 | 0.001 | 0.002 | <0.0005 | <0.0005 | <0.0005 | <0.0005 | <0.0005 | <0.0005 |
| 18 | 0.0005 | 3.3 | 0.073 | 0.001 | 0.001 | 0.002 | 0.001 | 0.003 | 0.08 | <0.0005 | <0.0005 | <0.0005 | <0.0005 | <0.0005 |
| 19 | 0.0005 | 3.3 | 0.074 | 0.001 | 0.001 | 0.002 | 0.001 | 0.003 | 0.051 | <0.0005 | <0.0005 | <0.0005 | <0.0005 | <0.0005 |
| 20 | 0.0005 | 3.3 | 0.075 | 0.001 | <0.0005 | 0.001 | 0.002 | 0.003 | 0.07 | 0.03 | <0.0005 | <0.0005 | <0.0005 | <0.0005 |
| 21 | 0.0005 | 3.3 | 0.077 | 0.001 | <0.0005 | 0.001 | 0.001 | 0.003 | 0.08 | <0.0005 | 0.04 | <0.0005 | <0.0005 | <0.0005 |
| 22 | 0.0005 | 3.3 | 0.074 | 0.001 | 0.001 | 0.002 | 0.001 | 0.003 | 0.07 | 0.11 | 0.08 | <0.0005 | <0.0005 | <0.0005 |
| 23 | 0.0005 | 3.3 | 0.075 | 0.001 | <0.0005 | 0.001 | 0.001 | 0.002 | 0.09 | 0.42 | <0.0005 | <0.0005 | <0.0005 | <0.0005 |
| 24 | 0.0005 | 3.3 | 0.075 | 0.001 | 0.001 | 0.002 | 0.001 | 0.003 | 0.05 | 0.08 | <0.0005 | 0.002 | <0.0005 | <0.0005 |
| 25 | 0.0005 | 3.3 | 0.080 | 0.001 | <0.0005 | 0.001 | 0.001 | 0.002 | 0.07 | 0.07 | <0.0005 | 0.002 | 0.002 | <0.0005 |
| 26 | 0.0005 | 3.3 | 0.074 | 0.001 | 0.001 | 0.002 | 0.001 | 0.002 | <0.0005 | 0.07 | 0.04 | <0.0005 | <0.0005 | 0.001 |
| 27 | 0.0005 | 3.3 | 0.075 | 0.001 | 0.001 | 0.002 | 0.001 | 0.003 | 0.07 | 0.07 | <0.0005 | 0.002 | 0.003 | 0.001 |

Evaluation of Properties

In Molten Steel Nos. 1, 2, 16, 18, 19, 20, 21, 22, 24, 25, 26, and 27 with constituents of the steel sheet in the scope of the present invention, the magnetic properties of the grain-oriented electrical steel sheet manufactured and the adhesion of the primary coating were evaluated. The magnetic properties of the grain-oriented electrical steel sheet manufactured and the adhesion of the primary coating were evaluated as Test Nos. 1 to 52.

Magnetic Properties

From each of the grain-oriented electrical steel sheets of the numbered tests, a sample of a rolling direction length of 300 mm×width 60 mm was taken. The sample was subjected to a magnetic field of 800 Å/m to find the magnetic flux density B8. Further, an insulating coating comprised mainly of colloidal silica and a phosphate was baked on, then the iron loss W17/50 at the time of excitation at of maximum magnetic flux density of 1.7 T and a frequency of 50 Hz was measured. Grain-oriented electrical steel sheet having a magnetic flux density B8 of 1.92 T or more and a W17/50 of 0.75 W/kg or less was deemed excellent in magnetic properties.

Adhesion

A sample of a rolling direction length of 60 mm×width 15 mm was taken from each of the grain-oriented electrical steel sheets of the numbered tests. The sample was subjected to a flex test by a curvature of 10 mm. The flex test was performed using a cylindrical mandrel flex testing machine while setting it at the sample so that the axial direction of the cylinder matched the width direction of the sample. The surface of the sample after the flex test was examined and the total area of the regions where the primary coating remained without being peeled off was found. The following formula was used to find the remaining rate of the primary coating.

Remaining rate of primary coating=total area of regions in which primary coating remains without being peeled off/area of sample surface×100

A remaining rate of the primary coating of 90% or more was deemed excellent in coating adhesion.

Point Defects

A sample of a rolling direction length 1 μm×width 1 μm was taken from the grain-oriented electrical steel sheet of each numbered test and visually examined to find the frequency NP of occurrence of point defects (number density of pores). The point defects were inhibited if the number of point defects in 1 m$^2$ is 5 or less.

Primary Coating Structure

A sample of a rolling direction length 300 mm×width 60 mm was taken from each of the oriented electrical sheets of the numbered tests and electrolyzed by a constant potential in an electrolytic solution so that only the base steel sheet started to dissolve. The primary coating was peeled off and the structure and the composition of the primary coating were investigated. The method of peeling and methods of measurement used followed the above-mentioned means. The electrolytic solution used was a nonaqueous solvent-based 10% acetyl acetone-1% tetramethyl ammonium chloride methanol. The amount of electrolysis was 80 C/cm$^2$. Finally, the following values were obtained.

(1) Number density D3 of Al concentrated regions
(2) Area S5 of regions comprised of anchoring oxide layer regions and Al concentrated regions
(3) Area S3 of Al concentrated regions
(4) Distance H5 of regions comprised of anchoring oxide layer regions and Al concentrated regions from reference value H0 of interface of surface oxide layer and anchoring oxide layer
(5) Total content of Y group elements
(6) Total content of Ca group elements
(7) Number density D4 of Ca group concentrated regions
(8) Area S1 of anchoring oxide layer regions
(9) Observed area S0

Annealing Separator Layer

A sample was cut from the steel sheet in the state before the finish annealing and after drying the aqueous slurry. The annealing separator layer was examined in accordance with the above-mentioned method.

(10) Number density D42 of Ca group concentrated regions at the annealing separator layer was obtained Annealing Separator The raw material powder of the annealing separator of the aqueous slurry was measured in accordance with the above-mentioned means and the following values obtained:

(11) Total abundance ratio CY of Y group elements (0.00562[Y]+0.00360[La]+0.00714[Ce])/0.0412[Mg]×100(%)

(12) Content CC of Ca group elements CC (0.0249[Ca]+0.0114[Sr]+0.0073[Ba])/0.0412[Mg]×100(%)

(13) Mean particle size R1 of MgO
(14) Mean particle size R2 of Ca group element comprising particles Further, only the MgO of the annealing separator was separated and the following values obtained:

(16) Amount CC' of impurity Ca group elements in MgO (0.024 9[Ca']+0.0114[Sr']+0.0073[Ba'])/0.0412×100(%)

(17) Ratio CC'/CC (16)/(12) of impurities in MgO in total amount of Ca group elements in annealing separator Note that, RCa, RSr, and RBa are respectively mean values of the circle equivalent diameters of Ca, Sr, and Ba

EXAMPLE 1

The aqueous slurry to be coated on the steel sheet after the decarburization annealing was prepared by mixing the MgO, Y group element-comprising compounds, and Ca group element-comprising compounds with water to give contents of the group elements such as shown in Table 2. At that time, the types of compounds and the ratios of existence of the group elements (CY, CC) were changed.

Table 4 shows the results. If the remaining rate of the primary coating is 90% or more, it is judged that the adhesion of the primary coating to the base steel sheet is excellent. It is learned that satisfaction of the provisions of the present invention results in good properties. Further, if the magnetic flux density B8 is 1.92 or more and the amount of occurrence of point defects is 5/μm$^2$ or less, it was judged there was the effect of inhibition of point defects. It is learned that satisfaction of the provisions of the present invention results in inhibition of point defects. Referring to Table 4, in Test Nos. 35 to 51, the chemical composition was suitable and the conditions in the annealing separator (CC, CC', CC'/CC, CY, R1, R2, R2/R1) were suitable. As a result, the area ratio S1/S0 of the anchoring oxide layer became 0.15 or more, the ratio S5/S3 of the anchoring Al regions A5 became 0.30 or more, the distance H5 was 0.4 or more, the number density D3 of the Al concentrated regions became 0.020 or more, and the results were within the scope of the present invention. As a result, in each of the grain-oriented electrical steel sheets of these numbered tests, the magnetic flux density B8 was 1.93 T or more and excellent magnetic properties were obtained. Furthermore, the remaining rate of the primary coating was 90% or more, the number NP of point defects occurring was 5/μm$^2$ or less, and excellent primary coating properties were exhibited.

On the other hand, in Test Nos. 1 to 3, the total abundance ratio CC of the Ca group elements was too small, the primary coating did not develop in form, S1/S0 became less than 0.18, S5/S3 became less than 0.30, and D3 became less than 0.005. As a result, the remaining rates of the primary coating respectively were 82%, 84%, and 76% and the coating adhesion became poor.

In Test Nos. 4 to 6, the total abundance ratio CC of the Ca group elements was too large, the form of the primary coating developed too much, and D3 was over $0.150/\mu m^2$. As a result, the iron loss W17/50 was over 0.75 and the magnetic properties became poor.

In Test Nos. 7 to 9, the total abundance ratio CC' of the Ca group elements in the MgO was too small. Further, in Test Nos. 13 to 15, CC'/CC was too low, so the primary coating insufficiently developed in form and L5/S0 became less than $0.020 \, \mu m/\mu m^2$. As a result, $5/m^2$ or more of point defects occurred, the point defects became worse, the remaining rate of the primary coating fell below 90%, and the adhesion became poor.

In Test Nos. 10 to 12, the total abundance ratio CC' of the Ca group elements in the MgO was too large. Further, in Test Nos. 16 to 18, CC'/CC was too high, so the form of the primary coating developed too much and L5/S0 was over $0.500 \, \mu m/\mu m^2$. As a result, the iron loss W17/50 was over 0.75 and the magnetic properties became poor.

In Test Nos. 19 to 21, the total abundance ratio CY of Y group elements was too small, so the primary coating insufficiently developed in form and H5 fell below 0.4. As a result, the remaining rate of the primary coating became 90% or less and the adhesion became poor.

In Test Nos. 22 to 24, the total abundance ratio CY of Y group elements was too great, so the primary coating developed too much in form and H5 was over 4.0. As a result, the magnetic flux density became 1.93 T or less.

In Test No. 25, the mean particle size R1 based on the number of MgO was too small, so sheets stuck together during the finish annealing.

In Test No. 26, R1 was too large and the supply of Mg to the primary coating was slow. As a result, S1/S0, S5/S3, L5/S0, and H5 all fell below the reference values. As a result, the remaining rate of the primary coating was 42% and the coating adhesion was poor.

In Test Nos. 27, 29, and 31, R2 was too small, the supply of Ca group elements and Mg became lopsided, and S1/S0 became less than 0.15. As a result, the remaining rate of the primary coating was less than 90% and the coating adhesion was poor.

In Test Nos. 28, 30, and 32, R2 was too large, the supply of Ca group elements and Mg became lopsided, S1/S0 became less than 0.15, and D3 became less than 0.015. As a result, the remaining rate of the primary coating was less than 90% and the coating adhesion was poor.

In Test No. 33, R1 and R2 were in the ranges, but R2/R1 was over 3.0. As a result, the remaining rate of the primary coating was less than 90% and the coating adhesion was poor.

In Test No. 34, R1 and R2 were in the ranges, but R2/R1 fell below 0.3. As a result, $5/m^2$ or more of point defects occurred, the point defects became worse, the remaining rate of the primary coating fell below 90%, and the coating adhesion became poor.

In Test No. 52, the conditions of the annealing separator were in the ranges, but the contents of the Bi, Te, and Pb in the molten steel constituents were over 0.03%. As a result, the remaining rate of the primary coating was less than 90% and the coating adhesion was poor.

TABLE 4

| Test no. | Steel sheet no. | CC' (abundance ratio) | CC (abundance ratio) | CC'/CC | CY (abundance ratio) | R1 (μm) | R2 (μm) | R2/R1 | S1/S0 | S5/S3 | H5 | L5/S0 | D3 |
|---|---|---|---|---|---|---|---|---|---|---|---|---|---|
| 1 | 1 | 0.024 | 0.14 | 0.169 | 0.70 | 0.80 | 2.10 | 2.63 | 0.14 | 0.2800 | 1.31 | 0.055 | 0.014 |
| 2 | 2 | 0.012 | 0.14 | 0.090 | 0.42 | 0.80 | 2.08 | 2.60 | 0.13 | 0.2200 | 1.51 | 0.058 | 0.013 |
| 3 | 1 | 0.017 | 0.10 | 0.161 | 0.75 | 0.80 | 1.55 | 1.94 | 0.14 | 0.2400 | 2.22 | 0.057 | 0.014 |
| 4 | 2 | 0.072 | 1.85 | 0.039 | 0.50 | 0.80 | 2.10 | 2.63 | 0.18 | 0.3530 | 1.66 | 0.056 | 0.167 |
| 5 | 1 | 0.054 | 2.23 | 0.024 | 0.45 | 0.80 | 1.96 | 2.45 | 0.17 | 0.3721 | 1.60 | 0.053 | 0.172 |
| 6 | 2 | 0.050 | 2.17 | 0.023 | 0.54 | 0.60 | 0.31 | 0.52 | 0.19 | 0.3555 | 1.02 | 0.055 | 0.156 |
| 7 | 1 | 0.009 | 0.37 | 0.025 | 0.92 | 0.60 | 1.50 | 2.50 | 0.28 | 0.3133 | 2.34 | 0.019 | 0.028 |
| 8 | 2 | 0.006 | 0.28 | 0.023 | 0.56 | 0.60 | 0.32 | 0.53 | 0.18 | 0.3078 | 2.40 | 0.018 | 0.021 |
| 9 | 1 | 0.005 | 0.25 | 0.020 | 0.45 | 0.60 | 1.55 | 2.58 | 0.22 | 0.3049 | 2.23 | 0.011 | 0.018 |
| 10 | 2 | 0.082 | 0.90 | 0.091 | 0.71 | 0.80 | 2.08 | 2.60 | 0.18 | 0.3627 | 1.39 | 0.548 | 0.069 |
| 11 | 1 | 0.091 | 0.78 | 0.117 | 0.92 | 0.80 | 1.27 | 1.59 | 0.20 | 0.3429 | 2.14 | 0.661 | 0.056 |
| 12 | 2 | 0.110 | 1.01 | 0.110 | 0.53 | 0.80 | 1.23 | 1.54 | 0.21 | 0.3515 | 2.09 | 0.522 | 0.076 |
| 13 | 1 | 0.014 | 0.96 | 0.014 | 0.70 | 0.80 | 2.10 | 2.63 | 0.18 | 0.3343 | 1.28 | 0.018 | 0.073 |
| 14 | 2 | 0.012 | 1.02 | 0.012 | 0.56 | 0.60 | 1.24 | 2.07 | 0.18 | 0.3567 | 1.86 | 0.014 | 0.075 |
| 15 | 1 | 0.012 | 0.65 | 0.018 | 0.98 | 0.60 | 1.30 | 2.16 | 0.21 | 0.3338 | 1.68 | 0.018 | 0.047 |
| 16 | 2 | 0.074 | 0.21 | 0.347 | 1.41 | 0.60 | 1.55 | 2.58 | 0.22 | 0.3020 | 3.20 | 0.548 | 0.015 |
| 17 | 1 | 0.044 | 0.22 | 0.206 | 0.53 | 0.60 | 1.52 | 2.54 | 0.21 | 0.3026 | 1.06 | 0.661 | 0.017 |
| 18 | 2 | 0.072 | 0.35 | 0.209 | 0.97 | 0.80 | 2.08 | 2.60 | 0.21 | 0.3135 | 3.47 | 0.522 | 0.025 |
| 19 | 18 | 0.028 | 0.47 | 0.059 | 0.17 | 0.40 | 0.22 | 0.55 | 0.24 | 0.3213 | 0.30 | 0.082 | 0.037 |
| 20 | 18 | 0.028 | 0.92 | 0.030 | 0.18 | 0.80 | 1.50 | 1.88 | 0.25 | 0.3484 | 0.20 | 0.122 | 0.068 |
| 21 | 18 | 0.028 | 0.49 | 0.056 | 0.16 | 0.80 | 1.42 | 1.78 | 0.21 | 0.3319 | 0.20 | 0.108 | 0.037 |
| 22 | 18 | 0.028 | 0.96 | 0.029 | 1.69 | 0.80 | 1.42 | 1.78 | 0.28 | 0.3441 | 4.20 | 0.219 | 0.071 |
| 23 | 18 | 0.028 | 0.34 | 0.082 | 1.64 | 0.80 | 1.55 | 1.94 | 0.30 | 0.3132 | 4.10 | 0.241 | 0.024 |
| 24 | 18 | 0.028 | 0.65 | 0.043 | 1.69 | 0.80 | 1.55 | 1.94 | 0.28 | 0.3287 | 4.40 | 0.385 | 0.051 |
| 25 | 19 | 0.028 | 0.47 | 0.059 | 0.71 | 3.20 | 1.80 | 0.56 | 0.14 | 0.3332 | 2.36 | 0.422 | 0.036 |
| 26 | 19 | 0.028 | 0.47 | 0.059 | 0.34 | 0.09 | 0.22 | 2.44 | 0.12 | 0.2810 | 0.03 | 0.018 | 0.034 |
| 27 | 20 | 0.028 | 0.47 | 0.059 | 0.71 | 0.22 | 0.19 | 0.86 | 0.12 | 0.3277 | 1.54 | 0.129 | 0.035 |
| 28 | 21 | 0.028 | 0.47 | 0.059 | 0.34 | 1.20 | 3.20 | 2.67 | 0.14 | 0.3352 | 1.92 | 0.364 | 0.014 |
| 29 | 22 | 0.028 | 0.60 | 0.046 | 0.35 | 0.18 | 0.18 | 1.00 | 0.13 | 0.3256 | 1.82 | 0.125 | 0.047 |
| 30 | 24 | 0.036 | 0.72 | 0.049 | 0.72 | 1.20 | 3.50 | 2.92 | 0.14 | 0.3522 | 2.29 | 0.243 | 0.012 |
| 31 | 24 | 0.036 | 0.57 | 0.062 | 0.56 | 0.20 | 0.15 | 0.75 | 0.14 | 0.3438 | 1.23 | 0.224 | 0.043 |
| 32 | 22 | 0.036 | 0.59 | 0.060 | 0.55 | 1.50 | 3.80 | 2.53 | 0.13 | 0.3248 | 1.90 | 0.264 | 0.011 |
| 33 | 24 | 0.036 | 0.76 | 0.047 | 0.43 | 0.40 | 1.55 | 3.88 | 0.21 | 0.2920 | 1.08 | 0.2869 | 0.058 |
| 34 | 24 | 0.036 | 1.08 | 0.033 | 0.30 | 0.80 | 0.23 | 0.29 | 0.22 | 0.3415 | 1.64 | 0.115 | 0.014 |

TABLE 4-continued

| | | | | | | | | | | | | | | |
|---|---|---|---|---|---|---|---|---|---|---|---|---|---|---|
| 35 | 1 | 0.036 | 0.81 | 0.044 | 0.58 | 0.80 | 1.46 | 1.83 | 0.27 | 0.3474 | 1.91 | 0.0550 | 0.062 | |
| 36 | 1 | 0.036 | 0.91 | 0.039 | 0.52 | 0.80 | 1.48 | 1.85 | 0.18 | 0.3472 | 2.31 | 0.0228 | 0.066 | |
| 37 | 1 | 0.036 | 0.95 | 0.038 | 0.68 | 0.80 | 1.54 | 1.92 | 0.21 | 0.3368 | 1.43 | 0.4481 | 0.074 | |
| 38 | 1 | 0.036 | 1.00 | 0.035 | 0.57 | 0.80 | 1.53 | 1.91 | 0.28 | 0.3381 | 1.82 | 0.4025 | 0.076 | |
| 39 | 2 | 0.036 | 0.97 | 0.037 | 0.89 | 0.80 | 1.52 | 1.90 | 0.21 | 0.3500 | 2.93 | 0.1878 | 0.070 | |
| 40 | 2 | 0.036 | 0.90 | 0.039 | 0.75 | 0.80 | 1.49 | 1.86 | 0.22 | 0.3378 | 3.02 | 0.4695 | 0.065 | |
| 41 | 2 | 0.036 | 1.77 | 0.020 | 0.67 | 0.80 | 1.49 | 1.86 | 0.22 | 0.3602 | 2.82 | 0.2757 | 0.136 | |
| 42 | 2 | 0.036 | 1.68 | 0.021 | 0.80 | 0.80 | 1.42 | 1.78 | 0.2 | 0.3799 | 2.32 | 0.0488 | 0.129 | |
| 43 | 18 | 0.036 | 1.46 | 0.024 | 0.77 | 0.80 | 1.50 | 1.88 | 0.19 | 0.3798 | 2.27 | 0.0550 | 0.113 | |
| 44 | 18 | 0.036 | 1.59 | 0.022 | 0.77 | 0.80 | 1.55 | 1.94 | 0.2 | 0.3459 | 1.41 | 0.2640 | 0.116 | |
| 45 | 18 | 0.036 | 0.99 | 0.036 | 0.84 | 0.80 | 1.50 | 1.88 | 0.22 | 0.3424 | 3.16 | 0.1893 | 0.073 | |
| 46 | 20 | 0.036 | 0.96 | 0.037 | 0.34 | 0.80 | 1.50 | 1.88 | 0.19 | 0.3561 | 1.36 | 0.1939 | 0.069 | |
| 47 | 21 | 0.036 | 1.08 | 0.033 | 0.71 | 0.80 | 1.42 | 1.78 | 0.19 | 0.3712 | 2.73 | 0.2450 | 0.083 | |
| 48 | 22 | 0.036 | 0.94 | 0.038 | 0.76 | 0.80 | 1.42 | 1.78 | 0.18 | 0.3363 | 1.61 | 0.2980 | 0.068 | |
| 49 | 24 | 0.036 | 0.76 | 0.047 | 0.94 | 0.80 | 1.55 | 1.94 | 0.18 | 0.3367 | 1.77 | 0.1950 | 0.055 | |
| 50 | 25 | 0.036 | 0.80 | 0.045 | 0.86 | 0.80 | 1.55 | 1.94 | 0.18 | 0.3440 | 1.99 | 0.1364 | 0.061 | |
| 51 | 26 | 0.036 | 1.05 | 0.034 | 0.71 | 0.80 | 1.49 | 1.87 | 0.19 | 0.3444 | 1.85 | 0.4220 | 0.081 | |
| 52 | 27 | 0.036 | 1.48 | 0.024 | 1.09 | 0.80 | 1.48 | 1.84 | 0.2 | 0.3864 | 3.28 | 0.4421 | 0.112 | |

| | Constituents of primary coating | | Distribution of alkali earth metal compounds D42 | Evaluation | | | | |
|---|---|---|---|---|---|---|---|---|
| Test no. | Ca group element content in coating (mass %) | Y group element content in coating (mass %) D4 | | Primary coating remaining ratio (%) | Iron loss W17/50 (W/kg) | Magnetic flux density B8(T) | Point defects | Remarks |
| 1 | 0.04 | 0.96 | 0.004 | 0.006 | 82 | 0.743 | 1.932 | 4 | Comp. ex. |
| 2 | 0.09 | 0.74 | 0.004 | 0.006 | 84 | 0.703 | 1.942 | 2 | Comp. ex. |
| 3 | 0.08 | 1.25 | 0.003 | 0.009 | 76 | 0.737 | 1.930 | 4 | Comp. ex. |
| 4 | 6.49 | 0.52 | 0.117 | 0.088 | 92 | 0.768 | 1.934 | 1 | Comp. ex. |
| 5 | 7.20 | 0.63 | 0.135 | 0.110 | 90 | 0.758 | 1.932 | 1 | Comp. ex. |
| 6 | 7.22 | 0.68 | 1.070 | 0.818 | 92 | 0.772 | 1.935 | 2 | Comp. ex. |
| 7 | 0.12 | 1.23 | 0.043 | 0.036 | 87 | 0.718 | 1.938 | 8 | Comp. ex. |
| 8 | 0.28 | 0.87 | 0.150 | 0.829 | 88 | 0.725 | 1.933 | 8 | Comp. ex. |
| 9 | 0.28 | 0.73 | 0.035 | 0.026 | 87 | 0.717 | 1.937 | 7 | Comp. ex. |
| 10 | 0.56 | 0.77 | 0.047 | 0.038 | 92 | 0.792 | 1.938 | 4 | Comp. ex. |
| 11 | 0.45 | 1.07 | 0.131 | 0.097 | 93 | 0.766 | 1.933 | 2 | Comp. ex. |
| 12 | 0.89 | 0.66 | 0.171 | 0.128 | 92 | 0.782 | 1.932 | 3 | Comp. ex. |
| 13 | 0.34 | 0.67 | 0.054 | 0.049 | 86 | 0.728 | 1.934 | 8 | Comp. ex. |
| 14 | 0.72 | 1.17 | 0.190 | 0.145 | 85 | 0.717 | 1.938 | 7 | Comp. ex. |
| 15 | 0.38 | 1.66 | 0.125 | 0.088 | 87 | 0.747 | 1.930 | 8 | Comp. ex. |
| 16 | 0.14 | 1.86 | 0.033 | 0.015 | 92 | 0.754 | 1.945 | 5 | Comp. ex. |
| 17 | 0.13 | 0.98 | 0.031 | 0.018 | 91 | 0.801 | 1.935 | 3 | Comp. ex. |
| 18 | 0.17 | 1.15 | 0.017 | 0.013 | 91 | 0.759 | 1.933 | 4 | Comp. ex. |
| 19 | 0.12 | 0.08 | 1.135 | 0.922 | 84 | 0.716 | 1.937 | 2 | Comp. ex. |
| 20 | 0.23 | 0.07 | 0.119 | 0.090 | 84 | 0.715 | 1.940 | 4 | Comp. ex. |
| 21 | 0.34 | 0.06 | 0.120 | 0.047 | 87 | 0.722 | 1.936 | 2 | Comp. ex. |
| 22 | 0.56 | 6.22 | 0.153 | 0.088 | 92 | 0.745 | 1.926 | 2 | Comp. ex. |
| 23 | 0.29 | 6.37 | 0.097 | 0.033 | 94 | 0.749 | 1.929 | 2 | Comp. ex. |
| 24 | 0.64 | 6.88 | 0.213 | 0.064 | 93 | 0.740 | 1.928 | 1 | Comp. ex. |
| 25 | 0.13 | 1.10 | 0.029 | 0.031 | 93 | 0.727 | 1.931 | 0 | Comp. ex. |
| 26 | 0.16 | 0.57 | 1.617 | 1.330 | 63 | 0.724 | 1.936 | 0 | Comp. ex. |
| 27 | 0.12 | 0.85 | 3.870 | 2.824 | 88 | 0.693 | 1.938 | 1 | Comp. ex. |
| 28 | 0.17 | 0.66 | 0.009 | 0.010 | 78 | 0.685 | 1.943 | 2 | Comp. ex. |
| 29 | 0.35 | 0.47 | 4.273 | 3.564 | 88 | 0.698 | 1.941 | 0 | Comp. ex. |
| 30 | 0.36 | 0.75 | 0.015 | 0.011 | 76 | 0.711 | 1.938 | 4 | Comp. ex. |
| 31 | 0.66 | 0.50 | 7.240 | 6.177 | 82 | 0.694 | 1.938 | 4 | Comp. ex. |
| 32 | 0.48 | 0.78 | 0.012 | 0.010 | 85 | 0.725 | 1.934 | 2 | Comp. ex. |
| 33 | 0.71 | 0.62 | 0.009 | 0.002 | 88 | 0.728 | 1.937 | 4 | Comp. ex. |
| 34 | 0.55 | 0.61 | 0.008 | 0.003 | 76 | 0.726 | 1.931 | 1 | Comp. ex. |
| 35 | 0.33 | 1.01 | 0.186 | 0.077 | 92 | 0.722 | 1.937 | 0 | Inv. ex. |
| 36 | 0.38 | 0.88 | 0.261 | 0.087 | 92 | 0.714 | 1.935 | 4 | Inv. ex. |
| 37 | 0.78 | 1.01 | 0.268 | 0.094 | 91 | 0.729 | 1.935 | 3 | Inv. ex. |
| 38 | 0.49 | 0.97 | 0.255 | 0.098 | 92 | 0.746 | 1.931 | 4 | Inv. ex. |
| 39 | 0.51 | 1.13 | 0.303 | 0.093 | 93 | 0.708 | 1.940 | 2 | Inv. ex. |
| 40 | 0.57 | 0.83 | 0.251 | 0.088 | 91 | 0.679 | 1.950 | 4 | Inv. ex. |
| 41 | 0.95 | 0.85 | 0.518 | 0.169 | 92 | 0.715 | 1.943 | 4 | Inv. ex. |
| 42 | 0.85 | 1.03 | 0.439 | 0.156 | 93 | 0.716 | 1.938 | 4 | Inv. ex. |
| 43 | 0.49 | 1.19 | 0.328 | 0.139 | 93 | 0.736 | 1.933 | 2 | Inv. ex. |
| 44 | 1.58 | 1.22 | 0.469 | 0.159 | 92 | 0.712 | 1.939 | 0 | Inv. ex. |
| 45 | 0.31 | 1.19 | 0.283 | 0.095 | 91 | 0.695 | 1.949 | 1 | Inv. ex. |
| 46 | 0.26 | 0.50 | 0.189 | 0.093 | 93 | 0.710 | 1.938 | 0 | Inv. ex. |
| 47 | 0.65 | 0.72 | 0.272 | 0.101 | 92 | 0.712 | 1.937 | 4 | Inv. ex. |
| 48 | 0.55 | 0.90 | 0.233 | 0.088 | 91 | 0.691 | 1.948 | 4 | Inv. ex. |
| 49 | 0.80 | 1.12 | 0.211 | 0.077 | 95 | 0.710 | 1.945 | 0 | Inv. ex. |
| 50 | 0.80 | 1.44 | 0.263 | 0.080 | 93 | 0.712 | 1.936 | 3 | Inv. ex. |

TABLE 4-continued

| 51 | 0.35 | 1.09 | 0.315 | 0.101 | 93 | 0.695 | 1.948 | 2 | Inv. ex. |
| 52 | 0.45 | 1.40 | 0.294 | 0.139 | 80 | 0.653 | 1.952 | 2 | Comp. ex. |

Above, embodiments of the present invention were explained. However, the embodiments explained above are only illustrations for working the present invention. Therefore, the present invention is not limited to the embodiments explained above and can be worked while suitably changing the embodiments explained above within a scope not deviating from its gist.

REFERENCE SIGNS LIST 1. surface oxide layer
2. anchoring oxide layer
3. deepest anchoring position
A0. entire observed region
A1. anchoring oxide region
A2. surface oxide layer region
A3. Al (aluminum) concentrated region
A4. Ca group element concentrated region
A5. Al (aluminum) concentrated region present in anchoring oxide region

The invention claimed is:

1. A grain-oriented electrical steel sheet comprising
a base steel sheet having a chemical composition comprising, by mass %,
  C: 0.0050% or less,
  Si: 2.5 to 4.5%,
  Mn: 0.02 to 0.20%,
  one or more elements of S and Se: total of 0.005% or less,
  sol. Al: 0.010% or less, and
  N: 0.010% or less and
having a balance comprised of Fe and impurities and
a primary coating formed on a surface of the base steel sheet and comprising 50 mass % or more of $Mg_2SiO_4$, where,
uneven-shape information of a surface of the primary coating when designating a direction from a primary coating side toward the base steel sheet in a thickness direction of the base steel sheet as positive is laid out projected on a plane parallel to the surface of the steel sheet,
when designating a center value of a surface height of the primary coating as H0, the primary coating existing at the base steel sheet side from H0+0.2 μm is prescribed as an "anchoring oxide layer region" and the primary coating existing at the primary coating side from H0+0.2 μm is prescribed as a "surface oxide layer region", and,
in a correlation distribution chart of a characteristic X-ray intensity laying out constituent information in the primary coating projected on the plane parallel to the surface of the steel sheet and uneven shape, a maximum value of the characteristic X-ray intensity of Al is identified and a region where a characteristic X-ray intensity of Al is 20% or more of the maximum value of the characteristic X-ray intensity of Al is defined as an "Al concentrated region",
the primary coating satisfies the conditions of
(1) Number density D3 of Al concentrated regions: 0.015 to 0.150/μm²,
(2) (Area S5 of regions which is anchoring oxide layer regions and is also Al concentrated regions)/(area S3 of Al concentrated regions)≥0.30,
(3) Distance H5 of mean value of heights in thickness direction of regions, which is anchoring oxide layer regions and is also AL concentrated regions, minus H0: 0.4 to 4.0 μm,
(4) (Perimeter L5 of regions which is anchoring oxide layer regions and is also Al concentrated regions)/(observed area S0): 0.020 to 0.500 μm/μm²,
(5) (Area S1 of anchoring oxide layer regions)/(observed area S0)≥0.15.

2. The grain-oriented electrical steel sheet according to claim 1, wherein
the primary coating comprises one or more elements of Y, La, and Ce and one or more elements of Ca, Sr, and Ba, and,
when, in the correlation distribution chart of characteristic X-ray intensity and uneven shape, maximum values of characteristic X-ray intensities of Ca, Sr, and Ba are identified and a region where a characteristic X-ray intensity of Ca is 20% or more of the maximum value of the characteristic X-ray intensity of Ca, a region where a characteristic X-ray intensity of Sr is 20% or more of the maximum value of the characteristic X-ray intensity of Sr, and a region where a characteristic X-ray intensity of Ba is 20% or more of the maximum value of the characteristic X-ray intensity of Ba are together defined as "Ca group element concentrated regions",
the primary coating satisfies the conditions of
(6) Ratio of total content of the one or more elements of Y, La, and Ce to the content of $Mg_2SiO_4$ in the primary coating: 0.1 to 6.0%,
(7) Ratio of total content of the one or more elements of Ca, Sr, and Ba to the content of $Mg_2SiO_4$ in the primary coating: 0.1 to 6.0%,
(8) Number density D4 of Ca group element concentrated regions: 0.005 to 2.000/μm².

* * * * *